United States Patent
Frank et al.

(10) Patent No.: US 9,286,404 B2
(45) Date of Patent: Mar. 15, 2016

(54) METHODS OF SYSTEMS USING GEOGRAPHIC META-METADATA IN INFORMATION RETRIEVAL AND DOCUMENT DISPLAYS

(75) Inventors: John R. Frank, Cambridge, MA (US); Andras Kornai, Arlington, MA (US)

(73) Assignee: Nokia Technologies Oy, Espoo (FI)

( * ) Notice: Subject to any disclaimer, the term of this patent is extended or adjusted under 35 U.S.C. 154(b) by 1782 days.

(21) Appl. No.: 11/963,451

(22) Filed: Dec. 21, 2007

(65) Prior Publication Data

US 2009/0119255 A1    May 7, 2009

Related U.S. Application Data

(60) Provisional application No. 60/876,759, filed on Dec. 21, 2006.

(51) Int. Cl.
*G06F 7/00* (2006.01)
*G06F 17/30* (2006.01)

(52) U.S. Cl.
CPC .................................. *G06F 17/3087* (2013.01)

(58) Field of Classification Search
USPC .......................................... 715/200; 707/706
See application file for complete search history.

(56) References Cited

U.S. PATENT DOCUMENTS

| | | | |
|---|---|---|---|
| 5,032,989 A | 7/1991 | Tornetta | |
| 5,278,980 A | 1/1994 | Pedersen et al. | |
| 5,623,541 A | 4/1997 | Boyle et al. | |
| 5,659,732 A | 8/1997 | Kirsch | |
| 5,664,115 A | 9/1997 | Fraser | |
| 5,668,897 A | 9/1997 | Stolfo | |
| 5,761,328 A | 6/1998 | Solberg et al. | |
| 5,761,538 A | 6/1998 | Hull et al. | |
| 5,764,799 A | 6/1998 | Hong et al. | |
| 5,778,362 A | 7/1998 | Deerwester et al. | |
| 5,802,361 A | 9/1998 | Wang et al. | |
| 5,813,005 A | 9/1998 | Tsuchida et al. | |

(Continued)

FOREIGN PATENT DOCUMENTS

| EP | 1 426 876 A | 6/2004 |
|---|---|---|
| GB | 2364225 | 1/2002 |

(Continued)

OTHER PUBLICATIONS

Beard and Sharma, Multidimensional ranking for data in digital spatial libraries, Int. J. Digit. Libr. 1, pp. 153-160 (1997).

(Continued)

*Primary Examiner* — Kimberly Wilson
(74) *Attorney, Agent, or Firm* — Alston & Bird LLP

(57) ABSTRACT

A computer-implemented method involving a corpus of documents. The method includes accepting search criteria from a user, the search criteria including a domain identifier identifying a domain and including a filter condition specifying a geometric relationship between co-referenced locations; in response to accepting the search criteria from the user, searching among the corpus of documents to identify a set of documents, wherein each document among the set of documents contains anywhere within the document location-related information that refers to a location within the domain and satisfies the filter condition, and wherein the set of documents only includes documents that satisfy the filter condition; and identifying to the user the documents in the set of documents.

17 Claims, 7 Drawing Sheets

(56) References Cited

U.S. PATENT DOCUMENTS

| | | |
|---|---|---|
| 5,839,088 A | 11/1998 | Hancock et al. |
| 5,845,278 A | 12/1998 | Kirsch et al. |
| 5,852,810 A | 12/1998 | Sotiroff et al. |
| 5,856,060 A | 1/1999 | Kawamura et al. |
| 5,870,559 A | 2/1999 | Leshem et al. |
| 5,878,126 A | 3/1999 | Velamuri et al. |
| 5,893,093 A | 4/1999 | Wills |
| 5,920,856 A | 7/1999 | Syeda-Mahmood |
| 5,930,474 A | 7/1999 | Dunworth et al. |
| 5,958,008 A | 9/1999 | Pogrebisky et al. |
| 5,960,447 A | 9/1999 | Holt et al. |
| 5,961,571 A | 10/1999 | Gorr et al. |
| 5,961,572 A | 10/1999 | Craport et al. |
| 5,963,956 A | 10/1999 | Smartt |
| 5,978,747 A | 11/1999 | Craport et al. |
| 5,978,804 A | 11/1999 | Dietzman |
| 5,991,754 A | 11/1999 | Raitto et al. |
| 5,991,781 A | 11/1999 | Nielsen |
| 6,035,297 A | 3/2000 | Van Huben et al. |
| 6,052,691 A | 4/2000 | Ardoin et al. |
| 6,057,842 A | 5/2000 | Knowlton et al. |
| 6,070,157 A | 5/2000 | Jacobson et al. |
| 6,092,076 A | 7/2000 | McDonough et al. |
| 6,133,913 A | 10/2000 | White et al. |
| 6,144,962 A | 11/2000 | Weinberg et al. |
| 6,148,260 A | 11/2000 | Musk et al. |
| 6,148,289 A | 11/2000 | Virdy |
| 6,151,624 A | 11/2000 | Teare et al. |
| 6,184,823 B1 | 2/2001 | Smith et al. |
| 6,202,065 B1 | 3/2001 | Wills |
| 6,219,055 B1 | 4/2001 | Bhargava et al. |
| 6,233,618 B1 | 5/2001 | Shannon |
| 6,236,768 B1 | 5/2001 | Rhodes et al. |
| 6,237,006 B1 | 5/2001 | Weinberg et al. |
| 6,240,410 B1 | 5/2001 | Wical |
| 6,240,413 B1 | 5/2001 | Learmont |
| 6,249,252 B1 | 6/2001 | Dupray |
| 6,266,053 B1 | 7/2001 | French et al. |
| 6,269,368 B1 | 7/2001 | Diamond |
| 6,275,610 B1 | 8/2001 | Hall et al. |
| 6,282,540 B1 | 8/2001 | Goldensher et al. |
| 6,295,528 B1 | 9/2001 | Marcus et al. |
| 6,341,310 B1 | 1/2002 | Leshem et al. |
| 6,343,139 B1 | 1/2002 | Finkelstein et al. |
| 6,343,290 B1 | 1/2002 | Cossins et al. |
| 6,366,851 B1 | 4/2002 | Chojnacki et al. |
| 6,377,961 B1 | 4/2002 | Ryu et al. |
| 6,397,228 B1 | 5/2002 | Lamburt et al. |
| 6,411,293 B1 | 6/2002 | Sakamoto et al. |
| 6,470,287 B1 | 10/2002 | Smartt |
| 6,470,383 B1 | 10/2002 | Leshem et al. |
| 6,493,711 B1 | 12/2002 | Jeffrey |
| 6,542,813 B1 | 4/2003 | Kovacs et al. |
| 6,556,990 B1 | 4/2003 | Lane |
| 6,577,714 B1 | 6/2003 | Darcie et al. |
| 6,584,459 B1 | 6/2003 | Chang et al. |
| 6,629,065 B1 | 9/2003 | Gadh et al. |
| 6,631,364 B1 | 10/2003 | Rioux et al. |
| 6,636,803 B1 | 10/2003 | Hartz, Jr. et al. |
| 6,640,145 B2 | 10/2003 | Hoffberg et al. |
| 6,701,307 B2 | 3/2004 | Himmelstein et al. |
| 6,711,585 B1 | 3/2004 | Copperman et al. |
| 6,721,728 B2 | 4/2004 | McGreevy |
| 6,731,314 B1 | 5/2004 | Cheng et al. |
| 6,741,981 B2 | 5/2004 | McGreevy |
| 6,823,333 B2 | 11/2004 | McGreevy |
| 6,850,252 B1 | 2/2005 | Hoffberg |
| 6,853,389 B1 | 2/2005 | Ikeda et al. |
| 6,859,800 B1 | 2/2005 | Roche et al. |
| 6,862,586 B1 | 3/2005 | Kreulen et al. |
| 6,871,140 B1 | 3/2005 | Florance et al. |
| 6,934,710 B1 | 8/2005 | Mills |
| 7,007,228 B1 | 2/2006 | Carro et al. |
| 7,017,285 B2 | 3/2006 | Lakic |
| 7,024,403 B2 | 4/2006 | Kyler |
| 7,035,869 B2 | 4/2006 | Smartt |
| 7,065,532 B2 | 6/2006 | Elder et al. |
| 7,092,969 B2 | 8/2006 | Meek et al. |
| 7,107,285 B2 | 9/2006 | von Kaenel et al. |
| 7,117,199 B2 | 10/2006 | Frank et al. |
| 7,143,344 B2 | 11/2006 | Parker et al. |
| 7,163,739 B2 | 1/2007 | Koike et al. |
| 7,181,502 B2 | 2/2007 | Incertis |
| 7,233,942 B2 | 6/2007 | Nye et al. |
| 7,246,116 B2 | 7/2007 | Barsness et al. |
| 7,254,580 B1 | 8/2007 | Gharachorloo et al. |
| 7,274,332 B1 | 9/2007 | Dupray |
| 7,310,633 B1 | 12/2007 | Wang et al. |
| 7,325,201 B2 | 1/2008 | Ferrari et al. |
| 7,353,113 B2 | 4/2008 | Sprague et al. |
| 7,373,246 B2 | 5/2008 | O'Clair |
| 7,393,924 B2 | 7/2008 | Vitaliano et al. |
| 7,403,939 B1 | 7/2008 | Virdy |
| 7,411,204 B2 | 8/2008 | Appleby et al. |
| 7,428,528 B1 | 9/2008 | Ferrari et al. |
| 7,437,703 B2 | 10/2008 | Wu |
| 7,473,843 B2 | 1/2009 | Wang et al. |
| 7,483,025 B2 | 1/2009 | Roy et al. |
| 7,483,881 B2 | 1/2009 | Egnor et al. |
| 7,522,760 B1 | 4/2009 | Will et al. |
| 7,539,693 B2 | 5/2009 | Frank et al. |
| 7,596,581 B2 | 9/2009 | Frank et al. |
| 7,676,452 B2 | 3/2010 | Doganata et al. |
| 7,698,059 B2 | 4/2010 | O'Clair |
| 7,698,336 B2 | 4/2010 | Nath |
| 7,720,723 B2 | 5/2010 | Dicker et al. |
| 7,720,806 B2 | 5/2010 | Piedmonte |
| 7,756,753 B1 | 7/2010 | McFarland |
| 7,792,883 B2 | 9/2010 | Buron et al. |
| 7,908,280 B2 | 3/2011 | Frank et al. |
| 2001/0011270 A1 | 8/2001 | Himmelstein et al. |
| 2001/0011365 A1 | 8/2001 | Helfman |
| 2001/0014185 A1 | 8/2001 | Chitradon et al. |
| 2001/0014868 A1 | 8/2001 | Herz et al. |
| 2002/0000999 A1 | 1/2002 | McCarty et al. |
| 2002/0016796 A1 | 2/2002 | Hurst et al. |
| 2002/0032677 A1 | 3/2002 | Morgenthaler et al. |
| 2002/0055924 A1 | 5/2002 | Liming |
| 2002/0065844 A1 | 5/2002 | Robinson et al. |
| 2002/0076099 A1 | 6/2002 | Sakamoto et al. |
| 2002/0078035 A1 | 6/2002 | Frank et al. |
| 2002/0082901 A1 | 6/2002 | Dunning et al. |
| 2002/0107918 A1 | 8/2002 | Shaffer et al. |
| 2002/0126905 A1 | 9/2002 | Suzuki et al. |
| 2002/0151992 A1 | 10/2002 | Hoffberg et al. |
| 2002/0161736 A1 | 10/2002 | Beygelzimer et al. |
| 2002/0188599 A1 | 12/2002 | McGreevy |
| 2003/0001900 A1* | 1/2003 | Cabanes et al. ............... 345/810 |
| 2003/0004802 A1 | 1/2003 | Callegari |
| 2003/0004914 A1 | 1/2003 | McGreevy |
| 2003/0005053 A1 | 1/2003 | Novaes |
| 2003/0009458 A1 | 1/2003 | Nakano et al. |
| 2003/0037048 A1 | 2/2003 | Kabra et al. |
| 2003/0056175 A1 | 3/2003 | Fujihara |
| 2003/0078913 A1* | 4/2003 | McGreevy ........ G06F 17/30395 |
| 2003/0097357 A1 | 5/2003 | Ferrari et al. |
| 2003/0105682 A1 | 6/2003 | Dicker et al. |
| 2003/0187867 A1 | 10/2003 | Smartt |
| 2004/0078750 A1 | 4/2004 | Frank |
| 2004/0093328 A1 | 5/2004 | Damle |
| 2004/0095376 A1 | 5/2004 | Graham et al. |
| 2004/0100506 A1 | 5/2004 | Shiota et al. |
| 2004/0117358 A1 | 6/2004 | von Kaenel et al. |
| 2004/0119759 A1 | 6/2004 | Barros |
| 2004/0139400 A1 | 7/2004 | Allam et al. |
| 2004/0162675 A1 | 8/2004 | Moon et al. |
| 2004/0225635 A1 | 11/2004 | Toyama et al. |
| 2004/0236730 A1 | 11/2004 | Frank |
| 2005/0004910 A1 | 1/2005 | Trepess |
| 2005/0008849 A1 | 1/2005 | Kagami et al. |
| 2005/0091193 A1 | 4/2005 | Frank et al. |
| 2005/0091209 A1 | 4/2005 | Frank et al. |
| 2005/0096991 A1 | 5/2005 | Main, II et al. |
| 2005/0108001 A1 | 5/2005 | Aarskog |

(56) References Cited

U.S. PATENT DOCUMENTS

| | | |
|---|---|---|
| 2005/0108213 A1 | 5/2005 | Riise et al. |
| 2005/0108224 A1 | 5/2005 | Silverbrook et al. |
| 2005/0119824 A1 | 6/2005 | Rasmussen et al. |
| 2005/0149576 A1 | 7/2005 | Marmaros et al. |
| 2005/0193003 A1 | 9/2005 | Popovici |
| 2005/0198008 A1 | 9/2005 | Adler |
| 2005/0222879 A1 | 10/2005 | Dumas et al. |
| 2005/0246310 A1 | 11/2005 | Chang et al. |
| 2005/0270311 A1* | 12/2005 | Rasmussen et al. ........... 345/677 |
| 2005/0278378 A1* | 12/2005 | Frank .......................... 707/104.1 |
| 2005/0278616 A1 | 12/2005 | Eller |
| 2006/0004752 A1 | 1/2006 | Harel et al. |
| 2006/0004797 A1 | 1/2006 | Riise et al. |
| 2006/0010100 A1 | 1/2006 | McAvoy et al. |
| 2006/0015722 A1 | 1/2006 | Rowan et al. |
| 2006/0026170 A1 | 2/2006 | Kreitler et al. |
| 2006/0036588 A1 | 2/2006 | Frank et al. |
| 2006/0085234 A1 | 4/2006 | Cagan |
| 2006/0117067 A1* | 6/2006 | Wright et al. .............. 707/104.1 |
| 2006/0122794 A1 | 6/2006 | Sprague et al. |
| 2006/0149774 A1 | 7/2006 | Egnor |
| 2006/0155679 A1 | 7/2006 | Kothuri et al. |
| 2006/0159367 A1 | 7/2006 | Zeineh et al. |
| 2006/0174209 A1 | 8/2006 | Barros |
| 2006/0179453 A1 | 8/2006 | Kadie et al. |
| 2006/0184519 A1 | 8/2006 | Smartt |
| 2006/0200259 A1 | 9/2006 | Hoffberg et al. |
| 2006/0200260 A1 | 9/2006 | Hoffberg et al. |
| 2006/0217878 A1 | 9/2006 | Bramley |
| 2006/0224587 A1 | 10/2006 | Zamir et al. |
| 2006/0238379 A1 | 10/2006 | Kimchi et al. |
| 2006/0242126 A1 | 10/2006 | Fitzhugh |
| 2006/0271281 A1 | 11/2006 | Ahn et al. |
| 2007/0011150 A1 | 1/2007 | Frank |
| 2007/0016562 A1 | 1/2007 | Cooper |
| 2007/0018953 A1 | 1/2007 | Kipersztok |
| 2007/0073748 A1 | 3/2007 | Barney |
| 2007/0078768 A1 | 4/2007 | Dawson |
| 2007/0130112 A1 | 6/2007 | Lin |
| 2007/0143318 A1 | 6/2007 | Hendrey et al. |
| 2007/0156677 A1 | 7/2007 | Szabo |
| 2007/0179932 A1 | 8/2007 | Piaton |
| 2007/0186166 A1 | 8/2007 | Anderson et al. |
| 2007/0192300 A1 | 8/2007 | Reuther et al. |
| 2007/0198495 A1 | 8/2007 | Buron et al. |
| 2007/0198951 A1 | 8/2007 | Frank |
| 2007/0219968 A1* | 9/2007 | Frank ................................ 707/3 |
| 2007/0233692 A1 | 10/2007 | Lisa et al. |
| 2007/0239692 A1 | 10/2007 | Mcbride |
| 2007/0266337 A1 | 11/2007 | Friedland et al. |
| 2007/0288160 A1 | 12/2007 | Ebert |
| 2007/0288431 A1 | 12/2007 | Reitter et al. |
| 2007/0288437 A1 | 12/2007 | Xia |
| 2007/0294233 A1 | 12/2007 | Sheu et al. |
| 2008/0005101 A1 | 1/2008 | Chandra |
| 2008/0010262 A1 | 1/2008 | Frank |
| 2008/0010273 A1 | 1/2008 | Frank |
| 2008/0010605 A1 | 1/2008 | Frank |
| 2008/0033935 A1 | 2/2008 | Frank |
| 2008/0033936 A1 | 2/2008 | Frank |
| 2008/0033944 A1 | 2/2008 | Frank |
| 2008/0040336 A1 | 2/2008 | Frank |
| 2008/0052638 A1 | 2/2008 | Frank et al. |
| 2008/0056538 A1 | 3/2008 | Frank |
| 2008/0059452 A1 | 3/2008 | Frank |
| 2008/0065685 A1 | 3/2008 | Frank |
| 2008/0068380 A1 | 3/2008 | McAvoy et al. |
| 2008/0074423 A1* | 3/2008 | Gan et al. ...................... 345/427 |
| 2008/0086356 A1 | 4/2008 | Glassman et al. |
| 2008/0126191 A1 | 5/2008 | Schiavi |
| 2008/0131003 A1 | 6/2008 | Bober |
| 2008/0140348 A1 | 6/2008 | Frank |
| 2008/0215524 A1* | 9/2008 | Fuchs et al. ......................... 707/1 |
| 2009/0119255 A1 | 5/2009 | Frank et al. |
| 2009/0132316 A1 | 5/2009 | Florance et al. |
| 2009/0183097 A1 | 7/2009 | Bayiates |
| 2009/0299975 A1 | 12/2009 | Coifman et al. |
| 2010/0106752 A1 | 4/2010 | Eckhardt, III et al. |
| 2010/0188210 A1 | 7/2010 | Howard et al. |
| 2013/0132375 A1 | 5/2013 | Jones et al. |

FOREIGN PATENT DOCUMENTS

| | | |
|---|---|---|
| WO | WO-2005/114484 | 12/2005 |
| WO | WO-2007/002800 | 1/2007 |

OTHER PUBLICATIONS

Chen, et al., "The BioPortal Project: A National Center of Excellence for Infectious Disease Informatics", Proceedings of the 2006 International Conference on Digital Government Research, May 21-24, 2006, pp. 373-374.

Christel, M.G. et al., "Interactive Maps for a Digital Video Library", IEEE Multimedia, IEEE Service Center, New York, vol. 7, No. 1, Jan. 2000, pp. 60-67.

Clifton, et al., "GeoNODE: An End-to-End System from Research Components", the 17th International Conference on Data Engineering, Heidelberg, Germany, Apr. 2-6, 2001, 3 pages.

Duhring, "Geospatial Archive and Exploitation System", SGI White Paper, pp. 1-12 (Dec. 2001), 14 pages.

European Patent Office, Supplementary Partial European Search Report, for application No. EP 01925106.5-2001/US0140173, mailed Jun. 3, 2005, 2 pages.

Excerpts from Texis Tutorial, URL http://www.thunderstone, com/texis/site/demos/map/, 9 pages.

Gaede, V., "Multidimensional Access Methods", ACM Computing Surveys, vol. 30, No. 2, Jun. 1998, pp. 170-231.

Guting R H: "An Introduction to Spatial Database Systems" VLDB Journal, vol. 3, No. 4, Oct. 1994, pp. 357-399.

Hill and Rasmussen, "Geographic Indexing Terms as Spatial Indicators", in *Studies in Multimedia: State-of-the-Art Solutions in Multimedia and Hypertext*, Stone, et al., (Eds.), Medford, NJ: Learned Information, pp. 9-20, 1992.

Hill, "Spatial Access to, and Display of, Global Change Data: Avenues for Libraries", Proceedings of the Data Processing Clinic Geographic Information Systems and Libraries: Patrons, Maps, and Spatial Information, pp. 125-150, 1995.

Hyland, et al., "GEONODE: Visualizing News in Geospatial Context", Federal Data Mining Symposium and Exposition '99, AFCEA, Mar. 9-10, 1999, Washington, D.C., 12 pages.

International Search Report for International Patent Application No. PCT/US2007/013807 mailed Oct. 1, 2008, 8 pages.

International Search Report for PCT/US2007/003769, mailed Aug. 2, 2007, 4 pages.

International Search Report from PCT/US2007/075266 mailed Jan. 14, 2008, 13 pages.

International Search Report from PCT/US2007/075289, Mailed Feb. 12, 2008, 4 pages.

International Search Report from PCT/US2007/075294, Mailed Feb. 6, 2008, 4 pages.

International Search Report issued for PCT/US2007/083238, dated May 21, 2008, 15 pages.

International Search Report, PCT/US2006/025296, mailed Feb. 9, 2007, 6 pages.

Internet Website: http://mapsonus.switchboard.com/bin/maps-route, Show Route, pp. 1-3, Show Map, pp. 1-2, Jun. 14, 2001, 5 pages.

Internet Website: http://www.bbc.co.uk/h2g2/guide, The Hitchiker's Guide to the Galaxy, pp. 1-2, Jun. 14, 2001, 2 pages.

Internet Website: http://www.dogpile.com, homepage, pp. 1; Dogpile Local Search, pp. 1, Jun. 14, 2001, 2 pages.

Internet website: http://www.mapblast.com, home page, Jun. 14, 2001, 1 page.

Internet Website: http://www.mapplanet.com, home page, p. 1; Guided Tour—Introduction, p. 1; Guided Tour—Navigation, p. 1; Guided Tour—Claming a cell, p. 1; Guided Tour—Registration, p. 1; Guided Tour—Signing in, p. 1; Guided Tour—Searching, p. 1; Guided Tour—Technical Requirements, p. 1, Jun. 14, 2001, 8 pages.

(56) References Cited

OTHER PUBLICATIONS

Internet Website: http://www.northernlight.com, home page, pp. 1-2, 2000 Press Releases, Dec. 6; pp. 1-3, 2000 Press Releases, Jan. 19, pp. 1-3, 8 pages.

Internet Website:"http//www.ismap.com", home page; Locate addresses and local services in Europe, pp. 1-2, Jun. 14, 2001, 3 pages.

Korn, "A Taxonomy of Browsing Methods: Approaches to the Lost in Concept Space Problem", University of Maryland, Department of Computer Science, 1996, 27 pages.

Larson, "Geographic Information Retrieval and Spatial Browsing", in *Geographic Information Systems and Libraries: Patrons, Maps, and Spatial Information*, Papers presented at the 1995 Clinic on Library Applications of Data Processing, pp. 1, 81-123 (1995).

Larson, et al., "The Sequoia 2000 Electronic Repository," Digital Technical Journal, vol. 7(3), pp. 50-65 (1995).

Liu, et al., "A New Point Process Transition Density Model for Space-Time Event Prediction", IEEE Transactions on Systems, Man, and Cybernetics: Part C: Applications and Reviews, 34(3):310-324 (2004).

Liu, et al., "Criminal Incident Prediction Using a Point-Pattern-Based Density Model", International Journal of Forecasting, 19(4):603-622 (2003).

Mapquest, retrieved from the Internet: http://www.mapquest.com, retrieved Apr. 20, 2001, 9 pages.

Matheson, et al., Geoparser Evaluation (geoXwalk Phase III WP 4), University of Edinburgh Data Library, Aug. 2004 (9 pages).

Metacarta, "A White Paper on MetaCarta's Technology and Products", XP002463193, 2005, 24 pages.

Nadeau, et al., "Unsupervised Named-Entity Recognition: Generating Gazetteers and Resolving Ambiguity", Published at the 19th Canadian Conference on Artificial Intelligence, Quebec City, Quebec, Canada Jun. 7, 2006, NRC 48727 (13 pages).

Ooi et al., Indexing in Spatial Databases, pp. 1-71 (1993).

Open GIS Consortium, Request for Quotation and Call for Participation in the OGC Geospatial Fusion Services Testbed Phase 1, Jun. 2000, 93 pages.

Petras, et al., "Time Period Directories: A Metadata Infrastructure for Placing Events in Temporal and Geographic Context", Proceedings of the 6th ACM.IEEE-CS Joint Conference on Digital Libraries, Jun. 2006, pp. 151-160, XP002478581.

Plazanet, et al., "Experiments with Learning Techniques for Spatial Model Enrichment and Line Generalization,", Geoinformatica, 2(4):315-333 (1998).

Robertson, S.E. et al., "Simple, proven approaches to text retrieval", Technical Report, University of Cambrige, No. 356, May 1997, pp. 1-7.

Sekine and Isahara, "IREX Project Overview", Proceedings of LREC 2000: 2nd International Cofnerence on Language Resources & Evaluation, Athens (2000), 6 pages.

Sester et al., "Linking Objects of Different Spatial Data Sets by Integration and Aggregation", GeoInformatica 2:4, pp. 335-358 (1998).

Smith, T., "A Digital Library for Geographically Referenced Materials" IEEE Computer (1996), vol. 29, pp. 54-60.

Soffer, et al., "Integrating Symbolic Images into a Multimedia Database System using Classification and Abstraction Approaches", VLDB Journal, 7:253-274 (1998).

Su et al., "Morphological Models for the Collapse of Area Features in Digital Map Generalization", GeoInformatica 2:4, pp. 359-382 (1998).

Vilain, et al., "Exploiting Semantic Extraction for Spatiotemporal Indexing in GeoNODE", Published Apr. 2000, 9 pages.

Ware and Jones, "Conflict Reduction in Map Generalization Using Iterative Improvement", GeoInformatica 2:4, pp. 383-407 (1998).

Weibel and Jones, "Computational Perspectives on Map Generalization", GeoInformatica 2:4, pp. 307-314 (1998).

Woodruff, et al., "GIPSY: Georeferenced Informatin Processing System", Computer Science Division University of California, Berkley and Library and Information Studies, University of California Berkley, pp. i-iii and 1-21 (1994).

Zeng, et al., "West Nile Virus and Botulism Portal: A Case Study in Infectious Disease Informatics", Lecture Notes in Computer Science: Intelligence and Security Informatics [Online], vol. 3037/2004, Aug. 24, 2004, pp. 28-41.

Supplementary European Search Report for corresponding EP app. No. 01925106.5-2201 dated Aug. 24, 2005, pp. 1-5.

European Office Action for corresponding EP app. No. 01925106.5-2201 dated Aug. 9, 2007, pp. 1-5.

European Office Action for corresponding EP app. No. 06 774 239.5-2201 dated Feb. 23, 2011.

European Office Action for corresponding EP app. No. 06 774 239.5-1952 dated Jul. 16, 2015.

Luo, Si et al.; "A Semisupervised Learning Method to Merge Search Engine Results"; Oct. 2003; ACM NY; vol. 21, pp. 457-491.

International Search Report and Written Opinion from International Application No. PCT/US2007/088737, dated Sep. 11, 2009.

International Search Report for International Application No. PCT/US01/40173, dated Jun. 28, 2001.

International Preliminary Examination Report for corresponding International Application No. PCT/US01/40173, dated Nov. 15, 2001.

International Preliminary Report on Patentability for corresponding International Application No. PCT/US2007/003769, dated Aug. 12, 2008.

International Preliminary Report on Patentability for corresponding International Application No. PCT/US2006/0025296, dated Jan. 9, 2008, pp. 1-9.

International Preliminary Report on Patentability for corresponding International Application No. PCT/US2007/013807, dated Dec. 16, 2008, pp. 1-10.

International Preliminary Report on Patentability for corresponding International Application No. PCT/US2007/075289, dated Feb. 10, 2009, pp. 1-8.

International Preliminary Report on Patentability for corresponding International Application No. PCT/US2007/075294, dated Feb. 10, 2009, pp. 1-6.

International Preliminary Report on Patentability for corresponding International Application No. PCT/US2007/083238, dated May 5, 2009, pp. 1-7.

Koshman, Sherry; "Visualization-Based Information Retrieval on the Web"; May 9, 2006; vol. 28, Issue 2; Summer 2006; pp. 192-207.

Metacarta, "MetaCarta GTS Systems", Feb. 6, 2005, pp. 1-2, Retrieved from the Internet: URL:http://web.archive.org/web/20050206162128/www.metacarta.com/products/gts/index.html [retrieved on Feb. 18, 2011].

Metacarta, "Technology", Feb. 6, 2005, pp. 1-4, Retrieved from the Internet: URL:http://web.archive.org/web/20050206071702/www.metacarta.com/technology/index/html [retrieved on Oct. 27, 2015].

Office Action for Canadian Patent Application No. 2,641,986, dated Jan. 22, 2013, pp. 1-4.

Gaihua Fu et al.; "Ontology-Based Spatial Query Expansion in Information Retrieval"; in "Lecture Notes in Computer Science 3761: On the Move to Meaningful Internet Systems 2005: CoopIS, DOA, and ODBASE"; Oct. 11, 2005, Springer, Berlin, Germany, XP019022991; pp. 1466-1482.

Jones, et al.; "The SPIRIT Spatial Search Engine: Architecture, Ontologies and Spatial Indexing"; Lecture Notes in Computer Science; vol. 3234; 2004; pp. 125-139; XP002530038.

Gaihua Fu et al.; "Building a Geographical Ontology for Intelligence Spatial Search on the Web"; Proceedings of the lasted International Conference on Databases and Applications (DBA2005); Feb. 14, 2005; XP002530039.

Clough, Paul: "Extracting Metadata for Spatially-Aware Information Retrieval on the Internet"; in: "Proceedings of the 2005 workshop on Geographic information retrieval" 2005; Association for Computing Machinery; New York, US; XP002530069.

Markowetz, Alexander et al.; Design and Implementation of a Geographic Search Engine; Jun. 16-17, 2005, 8th International Workshop on the Web and Databases (WebDB 2005), p. 1-6.

(56) References Cited

OTHER PUBLICATIONS

Ceseli et al.; "Modeling and Assessing Interference Exposure in Encrypted Databases"; ACM Transactions on Information and System Security; vol. 8, No. 1; Feb. 2005; pp. 119-152.

Henning, Maass; "Location-Aware Mobile Applications Based on Directory Services"; ACM Mobile Networks and Applications; Aug. 1998; pp. 157-173.

OpenLayers 3 [online] [retrieved Oct. 26, 2015]. Retrieved from the Internet: <URL: http://www.openlayers.org>. 3 pages.

Keyhole Markup Language [online] [retrieved Oct. 26, 2015]. Retrieved from the Internet: <URL: http://code.google.com/apis/kml/documentation/kml_tags_21.html>. 160 pages.

Office Action for related U.S. Appl. No. 11/705,269, dated Sep. 2, 2011.
Office Action for U.S. Appl. No. 11/705,269, dated Sep. 21, 2009.
Final Office Action for U.S. Appl. No. 11/705,269, dated Jun. 11, 2010.
Office Action for U.S. Appl. No. 11/705,368, dated Aug. 10, 2009.
Office Action for U.S. Appl. No. 11/705,368, dated Aug. 31, 2010.
Office Action for U.S. Appl. No. 11/705,368, dated Oct. 24, 2011.
Final Office Action for U.S. Appl. No. 11/705,368, dated May 20, 2010.
Final Office Action for U.S. Appl. No. 11/705,368, dated Dec. 30, 2010.
Notice of Allowance for U.S. Appl. No. 11/705,368, dated Aug. 28, 2015.
Office Action for U.S. Appl. No. 11/834,598, dated Jan. 20, 2011.
Office Action for U.S. Appl. No. 11/834,598, dated Oct. 29, 2009.
Final Office Action for U.S. Appl. No. 11/834,598, dated Jul. 20, 2010.
Final Office Action for U.S. Appl. No. 11/834,598, dated Jun. 23, 2011.
Office Action for U.S. Appl. No. 11/834,600, dated Dec. 9, 2009.
Office Action for U.S. Appl. No. 11/834,600, dated Jun. 4, 2013.
Final Office Action for U.S. Appl. No. 11/834,600, dated Jun. 29, 2011.
Office Action for U.S. Appl. No. 11/834,600, dated Feb. 22, 2011.
Final Office Action for U.S. Appl. No. 11/834,600, dated Aug. 31, 2010.
Office Action for U.S. Appl. No. 11/834,594, dated Sep. 10, 2012.
Office Action for U.S. Appl. No. 11/834,594, dated Jun. 10, 2011.
Office Action for U.S. Appl. No. 11/834,594, dated Jan. 6, 2012.
Office Action for U.S. Appl. No. 11/834,594, dated Mar. 13, 2013.
Final Office Action for U.S. Appl. No. 11/834,538, dated May 13, 2010.
Office Action for U.S. Appl. No. 11/834,538, dated Aug. 24, 2009.
Office Action for U.S. Appl. No. 11/834,538, dated Sep. 27, 2010.
Office Action for U.S. Appl. No. 11/834,563, dated Sep. 24, 2010.
Office Action for U.S. Appl. No. 11/834,563, dated Aug. 24, 2009.
Final Office Action for U.S. Appl. No. 11/834,563, dated May 13, 2010.
Office Action for U.S. Appl. No. 09/791,533, dated Nov. 1, 2005.
Office Action for U.S. Appl. No. 09/791,533, dated Jan. 6, 2005.
Office Action for U.S. Appl. No. 09/791,533, dated Aug. 13, 2003.
Final Office Action for U.S. Appl. No. 09/791,533, dated Jan. 14, 2004.
Final Office Action for U.S. Appl. No. 09/791,533, dated May 31, 2005.
Notice of Allowance for U.S. Appl. No. 09/791,533, dated Mar. 1, 2006.
Office Action for U.S. Appl. No. 11/818,066, dated Jul. 23, 2009.
Final Office Action for U.S. Appl. No. 11/818,066, dated Apr. 1, 2010.
Office Action for U.S. Appl. No. 11/818,074, dated Aug. 6, 2009.
Office Action for U.S. Appl. No. 11/818,074, dated Sep. 30, 2010.
Final Office Action for U.S. Appl. No. 11/818,074, dated Apr. 29, 2010.
Notice of Allowance for U.S. Appl. No. 11/818,074, dated May 2, 2011.
Office Action for U.S. Appl. No. 11/811,976, dated Jun. 23, 2010.
Office Action for U.S. Appl. No. 11/811,976, dated Nov. 17, 2010.
Office Action for U.S. Appl. No. 11/834,566, dated Sep. 8, 2009.
Office Action for U.S. Appl. No. 11/834,566, dated Oct. 14, 2010.
Final Office Action for U.S. Appl. No. 11/834,566, dated May 27, 2010.
Office Action for U.S. Appl. No. 11/834,584, dated Sep. 9, 2009.
Office Action for U.S. Appl. No. 11/857,987, dated Sep. 17, 2009.
Office Action for U.S. Appl. No. 11/857,987, dated Oct. 5, 2010.
Final Office Action for U.S. Appl. No. 11/857,987, dated May 28, 2010.
Final Office Action for U.S. Appl. No. 11/857,987, dated Mar. 7, 2011.
Office Action for U.S. Appl. No. 11/932,438, dated Oct. 8, 2010.

\* cited by examiner

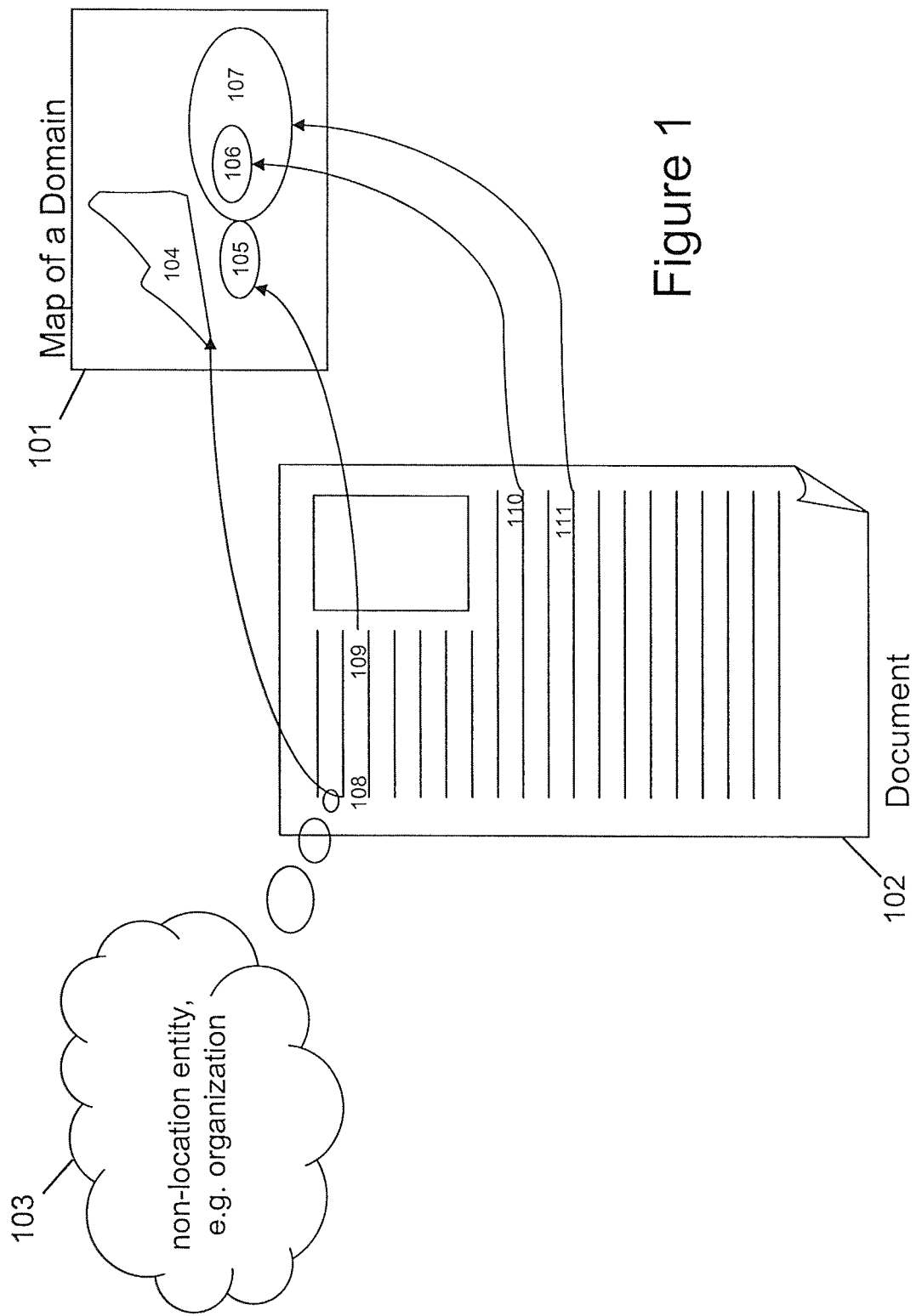

METHODS OF SYSTEMS USING GEOGRAPHIC META-METADATA IN INFORMATION RETRIEVAL AND DOCUMENT DISPLAYS

CROSS REFERENCE TO RELATED APPLICATIONS

This application claims the benefit of U.S. Patent Application No. 60/876,759, filed Dec. 21, 2006, entitled "Article Mapper with Geographic Search Enhancements," the entire contents of which are incorporated herein by reference.

This application is related to: U.S. Pat. No. 7,117,199, filed Feb. 22, 2001, entitled "Spatially Coding and Displaying Information;" U.S. patent application Ser. No. 11/427,165, filed Jun. 28, 2006, entitled "User Interface for Geographic Search;" U.S. patent application Ser. No. 11/705,368, filed Feb. 12, 2007, entitled "Systems and Methods for Spatial Thumbnails and Companion Maps for Media Objects;" U.S. patent application Ser. No. 11/705,269, filed Feb. 12, 2007, entitled "Systems and Methods for Spatial Thumbnails and Companion Maps for Media Objects;" U.S. patent application Ser. No. 11/818,066, filed Jun. 12, 2007, entitled "Systems and Methods for Hierarchical Organization and Presentation of Geographic Search Results;" U.S. patent application Ser. No. 11/818,074, filed Jun. 12, 2007, entitled "Systems and Methods for Providing Statistically Interesting Geographical Information Based on Queries to a Geographic Search Engine;" U.S. patent application Ser. No. 11/811,976, filed Jun. 12, 2007, entitled "Systems and Methods for Generating and Correcting Location References Extracted from Text;" U.S. patent application Ser. No. 11/834,538, filed Aug. 6, 2007, entitled "Systems and Methods for Presenting Results of Geographic Text Searches;" U.S. patent application Ser. No. 11/834,563, filed Aug. 6, 2007, entitled "Systems and Methods for Presenting Results of Geographic Text Searches;" U.S. patent application Ser. No. 11/834,566, filed Aug. 6, 2007, entitled "Systems and Methods for Presenting Results of Geographic Text Searches;" U.S. patent application Ser. No. 11/834,584, filed Aug. 6, 2007, entitled "Systems and Methods for Presenting Results of Geographic Text Searches;" U.S. patent application Ser. No. 11/834,594, filed Aug. 6, 2007, entitled "Systems and Methods for Obtaining and Using Information from Map Images;" U.S. patent application Ser. No. 11/834,598, filed Aug. 6, 2007, entitled "Systems and Methods for Obtaining and Using Information from Map Images;" U.S. patent application Ser. No. 11/834,600, filed Aug. 6, 2007, entitled "Systems and Methods for Obtaining and Using Information from Map Images;" U.S. patent application Ser. No. 11/857,987, filed Sep. 19, 2007, entitled "Systems and Methods for Presenting Results of Geographic Text Searches;" U.S. patent application Ser. No. 11/932,438, filed Oct. 31, 2007, entitled "Systems and Methods for Predictive Models Using Geographic Text Search;" and U.S. Patent Application No. 60/866,979, filed Nov. 22, 2006, entitled "Article Mapper with Geographic Search," all of which are incorporated herein by reference.

TECHNICAL FIELD

This invention relates to computer systems, and more particularly to spatial databases, document databases, search engines, and data visualization.

BACKGROUND

There are many tools available for organizing and accessing documents through various interfaces that help users find information. Some of these tools allow users to search for documents matching specific criteria, such as containing specified keywords. Some of these tools present information about geographic regions or spatial domains, such as driving directions presented on a map.

These tools are available on private computer systems and are sometimes made available over public networks, such as the Internet. Users can use these tools to gather information.

SUMMARY

In general, in one aspect, the invention features a computer-implemented method involving a corpus of documents. The method involves: accepting search criteria from a user, the search criteria including a domain identifier identifying a domain and including a filter condition specifying a geometric relationship between co-referenced locations; in response to accepting the search criteria from the user, searching among the corpus of documents to identify a set of documents, wherein each document among the set of documents contains anywhere within the document location-related information that refers to a location within the domain and satisfies the filter condition, and wherein the set of documents only includes documents that satisfy the filter condition; and identifying to the user the documents in the set of documents.

Other embodiments include one or more of the following features. The geometric relationship is any one or more of the following: one location is a container of another location; one location is contained in another location; one location overlaps with another location; or one location is a neighbor of another location.

In general, in another aspect, the invention features a computer-implemented method involving a corpus of documents that involves: accepting search criteria from a user, the search criteria including a domain identifier identifying a domain and a filter specifying a semantic category for referenced locations; in response to accepting the search criteria from the user, searching among the corpus of documents to identify a set of documents, wherein each document among the set of documents contains anywhere within the document location-related information that refers to a location within the domain and that satisfies the filter condition; and identifying to the user the documents in the set of documents.

Other embodiments include one or more of the following features. The semantic category is one of the following: a context-dependent property of the spatial indicator; a place-of-author; a place-of-subject; or a literal location.

In general, in yet another aspect, the invention features a computer-implemented method of displaying information about a document that includes a plurality of spatial identifiers each of which identifies a corresponding location within a metric space and at least two of which have a geometric relationship to each other. The method involves: displaying a visual representation of content from the document; displaying a map image of a portion of the metric space; displaying a visual indicator at a position on the map image representing the location that corresponds to one of the plurality of spatial identifiers; and visually indicating that the location corresponding to the visual indicator has associated data that characterizes the geometric relationship between that location and the location of another spatial identifier in the document.

In general, in still another aspect, the invention features a computer-implemented method of displaying information about a document that includes a spatial identifier that identifies a corresponding location within a metric space and wherein that spatial identifier is characterized by a semantic type that is determined by its use within the document. The method involves: displaying a visual representation of content from the document; visually identifying the spatial identifier within the displayed visual representation of the content from the document; and visually indicating the semantic type of the spatial identifier.

Other embodiments include the following features. The computer-implemented method further includes: along with the displayed visual representation of content, also displaying a map image of a portion of the metric space; and displaying a visual indicator at a position on the map image representing the location that corresponds to the spatial identifier;

In general, in still yet another aspect, the invention features a computer-implemented method of displaying information about a document that includes a spatial identifier that identifies a corresponding location within a metric space and wherein that spatial identifier is a semantic type. The method involves: displaying a visual representation of content from the document; displaying a map image of a portion of the metric space; displaying a visual indicator at a position on the map image representing the location that corresponds to the spatial identifier; and visually indicating the semantic type of the spatial identifier.

In general, in yet another aspect the invention features a computer readable medium storing code which when executed on a computer system performs the functions described above.

In general, still yet another aspect, the invention features a method of searching a corpus of documents, the method involving: accepting search criteria from a user, the search criteria including a geometric attribute; in response to accepting the search criteria, searching the corpus of documents to identify portions of the documents that reference locations in a metric vector space; analyzing the portions of the documents to identify the locations that satisfy the geometric attribute; and compiling a set documents and their corresponding location references that are responsive to the search criteria.

In general, in another aspect, the invention features a method of displaying information contained within a document, the method involving: receiving information that identifies a first portion of the document containing a first identifier that references a first location in a metric vector space; receiving information that identifies a second portion of the document containing a second identifier that references a second location in a metric vector space; receiving information describing a geometric relationship between the first location and the second location; displaying a map of a portion of the metric vector space, the domain encompassing at least a part of one of the first and second locations; and displaying at least one of the first location and the second location on the representation of the domain, wherein a mode of displaying the at least one of the first location and the second location is determined by the geometric relationship between the first and second locations.

In general, in another aspect, the invention features a method of displaying information contained within a document, the method involving: identifying a portion of the document that contains an identifier that references a location in a metric vector space; analyzing the portion of the document to obtain a semantic category of the identifier, the semantic category identifying a sense in which an author of the document intended to use the identifier in the portion of the document; displaying a representation of a domain of the metric vector space, the domain encompassing at least a part of the location referenced by the identifier; and displaying on the representation of the domain the location referenced by the identifier, wherein a mode of displaying the location referenced by the identifier is determined by the semantic category of the identifier.

BRIEF DESCRIPTION OF THE FIGURES

FIG. 1 is an illustration of a document having identifiers that refer to geographical locations.

DESCRIPTION

Figure 2C:
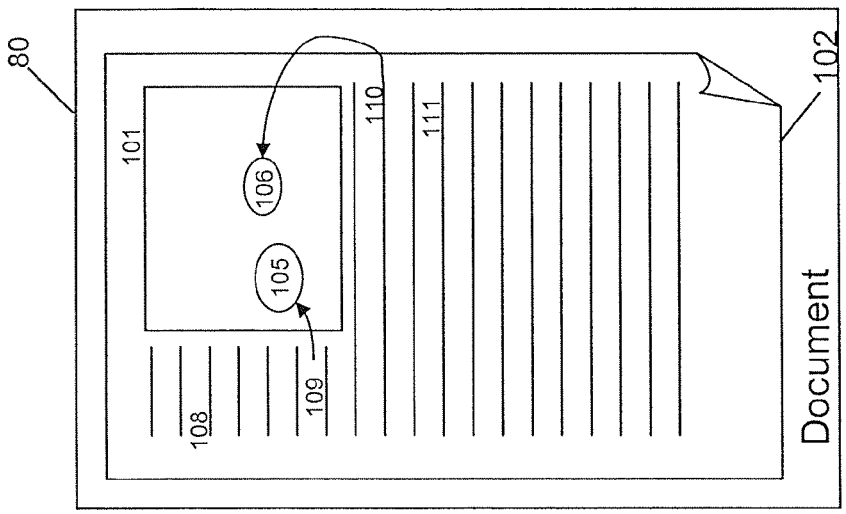
FIG. 2 illustrates various modes of displaying geographical information, according to the described embodiment.

In many information processing systems, geography has become an important aspect of searching for and displaying information about documents. Systems and methods that use geographic information about documents frequently use a geotagging system to obtain this information. A geotagging system process documents to generate so-called "geotags" that describe the association between a document and locations. As used herein, a location can mean a point, a line, and a region, such as an area bounded by a polygon. For example, a geotag might indicate that a particular phrase in a document's content probably refers to the building called the Sears Tower in the City of Chicago in the State of Illinois in the United States.

A geotagging system is a computer-implemented system that produces geographic metadata about digital content by analyzing the structured, semi-structured, and unstructured information in the content. For example, a geotagger system might take a PDF file as input and analyze its textual content to find strings of text that appear to refer to places on Earth. For example, if the document contains the string "Cambridge," the geotagger system might indicate in its output response that the document has a particular probability of referring to the City of Cambridge in Massachusetts and a different probability of referring to the City of Cambridge in the United Kingdom. The association between the document and these locations is metadata.

Often the association between a document and a location is based on digital content contained within the document. In other cases, the association may be based on other information that is not contained within the document itself. For example, a database system may associate coordinates, location names, or other location identifiers with document identifiers. Such document identifiers might be numbers or URLs that allow a system to obtain the contents of the document. The database field that identifies a location may be the only source of association between the document and the location. A geotagger system might use such a database table to allow people to assign location associations to documents without modifying the contents of the document. Regardless of the source of the association, a geotagger system is any system that identifies an association between a document and a location in a metric vector space.

It is often useful to provide additional types of metadata in the geotagger output. For example, by including a "feature type" for each location, a visual display can select an appropriate icon to illustrate the location. A feature type is a categorization of the location. The enumeration of feature types can be quite long. For example a wide variety of geologic feature types are used in geoscience, including drumlins, eskers, and moraines. Different levels of administrative regions are also "types" of locations. A building is a different type of location from a landmark. For example, if a document refers to Westminster Cathedral, a geotagger system indicates not only the coordinates for this building but also a Type=Church attribute that allows a visual display to use an icon resembling a church to indicate the location on a map. This church icon is used in illustrating search results on a map or in augmenting the visual display of a single document. This example of metadata that we call feature type is an attribute of the location and is not influenced by the particulars of a document that references it. Other attributes of a location might be the population count of how many people live there, or the average annual rainfall. Attributes and meta-metadata are similar concepts. We use the term meta-metadata to mean those attributes that are defined with reference to a particular document. That is, meta-metadata are attributes of a location that cannot be defined without identifying a particular document that is associated with that location. For example, the fact that a document refers to a location in the "byline" of the document is an attribute of that location, which is an attribute that cannot be defined without identifying that particular document.

We now describe two types of metadata that we have found valuable for several uses of geotagger systems described herein. These two types of metadata describe properties of the geographic locations in the context of a particular document. That is, these pieces of metadata can only be determined with reference to a particular document. While attributes like the number of people who live in a particular place is a fact independent of any documents that refer to that place, other attributes are defined in relation to a particular document. For example, if a document mentions two locations, then an attribute of those two locations is that they have been co-referenced. The existence of that co-reference depends on that particular document—by definition. We will discuss several more attributes and meta-metadata examples below.

A geotag is a piece of metadata, i.e. it describes the data in the document. A geotagging system can also provide additional information about the metadata itself, i.e., meta-metadata ("MMD"). We have discovered that two particular pieces of MMD are particularly useful for utilizing geotags. These forms of meta-metadata describe relationships between locations that are co-referenced in a document and relationships between locations and other concepts identified in a document. "Co-reference" simply means that a document mentions both concepts. For example, a document might explicitly mention both the Sears Tower and the City of Chicago. By explicitly naming both places, the document co-references them. The spatial relationship between these two places can be easily determined using mapping algorithms or other data structures. Our system identifies that the City of Chicago spatially contains the Sears Tower, and provides this additional information as metadata about the document's metadata. Spatial relationships between co-referenced locations is the first of the two pieces of meta-metadata that we describe.

Some documents communicate about particular concepts without naming them explicitly. For example, a document might refer to the state government organization that runs Illinois using a metonymic reference such as "Springfield," which is the capital city of Illinois. While the document might not explicitly describe the state government organization, it communicates about the concept. By using a location name in place of a longer description, the author of the document uses "metonomy," which is a form of metaphor that refers to a concept by naming one of its attributes. This is an example of a semantic type that can be attributed to a particular location reference in a particular document.

Semantic types include using a location name as a metaphor for an organization or event, using a location name to identify the location of the author, using a location name to identify the location of a past or anticipated future event. Like spatial relationships between co-referenced locations, the semantic category of a location reference can only be determined in the context of a particular document.

Thus, both spatial relationships between co-referenced locations and the semantic typing of location references are meta-metadata attributes of the relationship between a document and one or more locations.

FIG. 1 illustrates examples of metadata based on co-referenced locations and on semantic categories. Document 102 refers to locations in map 101. The locations in map 101 are highlighted by visual indicators numbers 104, 105, 106, and 107, and are referred to by portions of document 102 numbered 108, 109, 110, and 111 respectively. Location reference 108 also connotes concept 103 that is not literally a location, but is an organization, such as the US Government, which is often referred to in a metonymic fashion with names like "Washington" or "the US." Locations 106 and 107 are relating by containment, i.e., 107 contains 106. Locations 105 and 107 are related by adjacency. In this case, 105 is positioned at smaller X-coordinates than coordinates describing 107, and they share a border.

While semantic typing is known in the art of natural language processing, and spatial relationships are familiar to everyone, we propose a new set of uses for these ideas in the context of using meta-metadata to improve the performance of information retrieval and document display.

Our system includes three sub-systems that utilize meta-metadata:

1. In visually displaying content from a document, meta-metadata is used to change the visual representation of different locations in the document.
2. In searching for documents matching various geographic and non-geographic query criteria, meta-metadata is used to further refine the criteria and improve the utility of the result set generated in response to the query.
3. To support the visual display of content from documents and the searching of collections of documents, the system provides an application programmer interface (API) to a geotagger, the API including meta-metadata so that downstream applications need not attempt to reproduce it.

As described, for example, in U.S. Patent Application 60/876,759, which focuses on mapping the content of articles, the output of a geotagger system can be used to enhance the visual display of a document to a human user. Such visual displays often include one or more map images, and textual effects that highlight certain strings of text that are associated with places in the map images. For example, such a visual display might highlight geographic references by underlining them, and when a user selects a visual indicator of a location in a map image, the display might change the font color of the strings that refer to that location. This type of user interface helps users understand the geographic meanings of a document of interest. Without these visual aides, a user must manually cut-and-paste text from the document into a system that allows for the lookup of locations by name. The article mapper concept allows people to rapidly understand which locations the author meant without leaving the document view. Meta-metadata can be used to visually differentiate between various locations and references to them in a document. When visually indicating that a document is associated with a location, a user interface can also visually indicate other attributes of the location. For example, a user interface might use different markers for locations that have different sizes of human population. The size of the human population in these locations is an attribute of the location, and it can be visually indicated in a user interface. A user interface can also visually indicate attributes of a location that are meta-metadata, i.e., defined in relation to a particular document. For example, a user interface might visually indicate that a location is used as a byline location, or is a container location, or is not a container location in a particular document. (A container location is a location that is co-referenced document with another location that is contained within it). Such a user interface will typically also identify the document or show content from the document.

As described in previous filings about geographic search, including U.S. Pat. No. 7,117,199, the geographic metadata from a geotagger can be used to enable search engines that use geographic attributes as additional search constraint and for displaying search results with geographical enhancements. If a query to such a system includes a "domain identifier," such as the name of a location or a map bounding box, then it responds by providing a list of documents that refer to locations within the specified domain. By indicating the locations referenced in the documents, the system radically accelerates the user's ability to figure out which information is relevant to their interests. Thus, meta-metadata can be used to visually differentiate search results, and also enables the results to be filtered further. For example, a search engine might allow users to exclude locations that have the semantic type place-of-author, because the byline is less interesting that place-of-subject locations. Similarly, it might allow users to exclude container locations from search results, because the most interesting locations tend to be those that are the smallest locations referenced in a given document.

Figure 3:
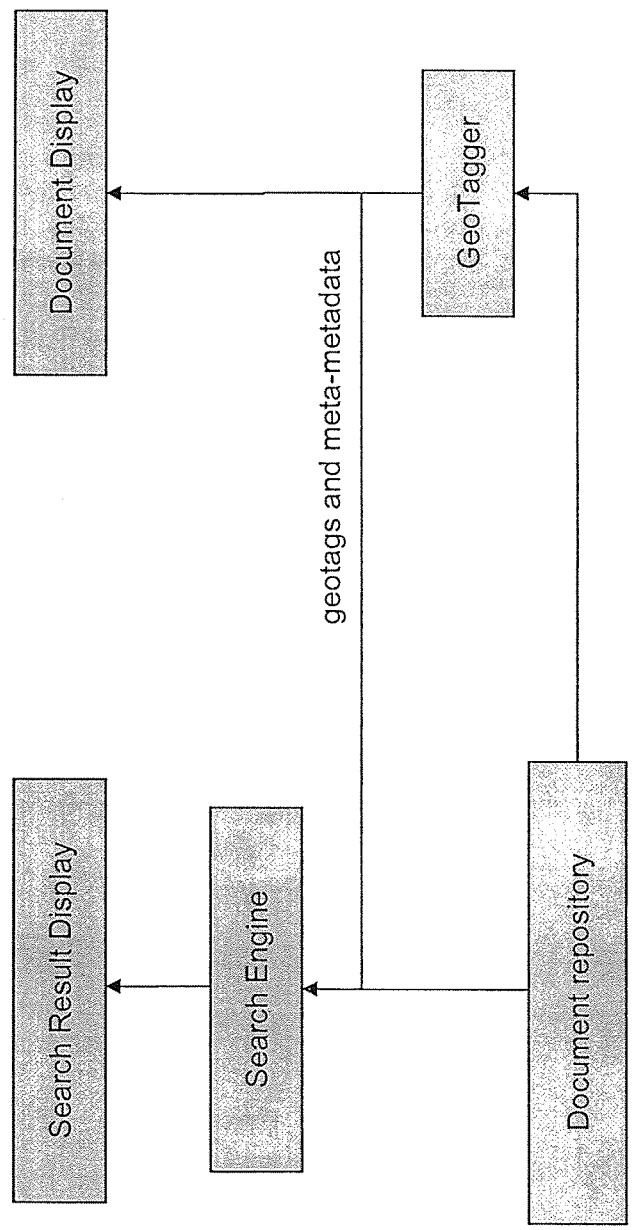
FIG. 3 is a block diagram showing two applications of meta-metadata.

The two applications of geotagger output described above, and many others, are typically constructed using computer systems that have multiple separate subsystems executing simultaneously. FIG. 3 illustrates the basic connections between subsystems. Geotagger 302 generates geotags and meta-metadata for documents from a collection of documents stored in document repository 304. The geotags and meta-metadata can influence document display 306. They can also be used as search criteria or search filters by search engine 308, which searches and retrieves documents from the document repository, and then displays the results on search result display 310. The described subsystems communicate with each other via programmatic interfaces called "application programmer interfaces" or "APIs." These APIs provide structured output in formats that can be passed between subsystems. A geotagger system can be a subsystem in such a larger system. The API provided by the geotagger subsystem accepts documents or document identifiers as input and responds with structured metadata indicating the positions of geographic references within the documents contents (e.g., using character range offsets or page numbers and paragraph numbers) and also geographic coordinates for the locations referenced in the text. Our geotagger API also provides an indication of the semantic type of some location references in the document and an indication of spatial relationships between some of the locations referenced in the text.

Figure 4:
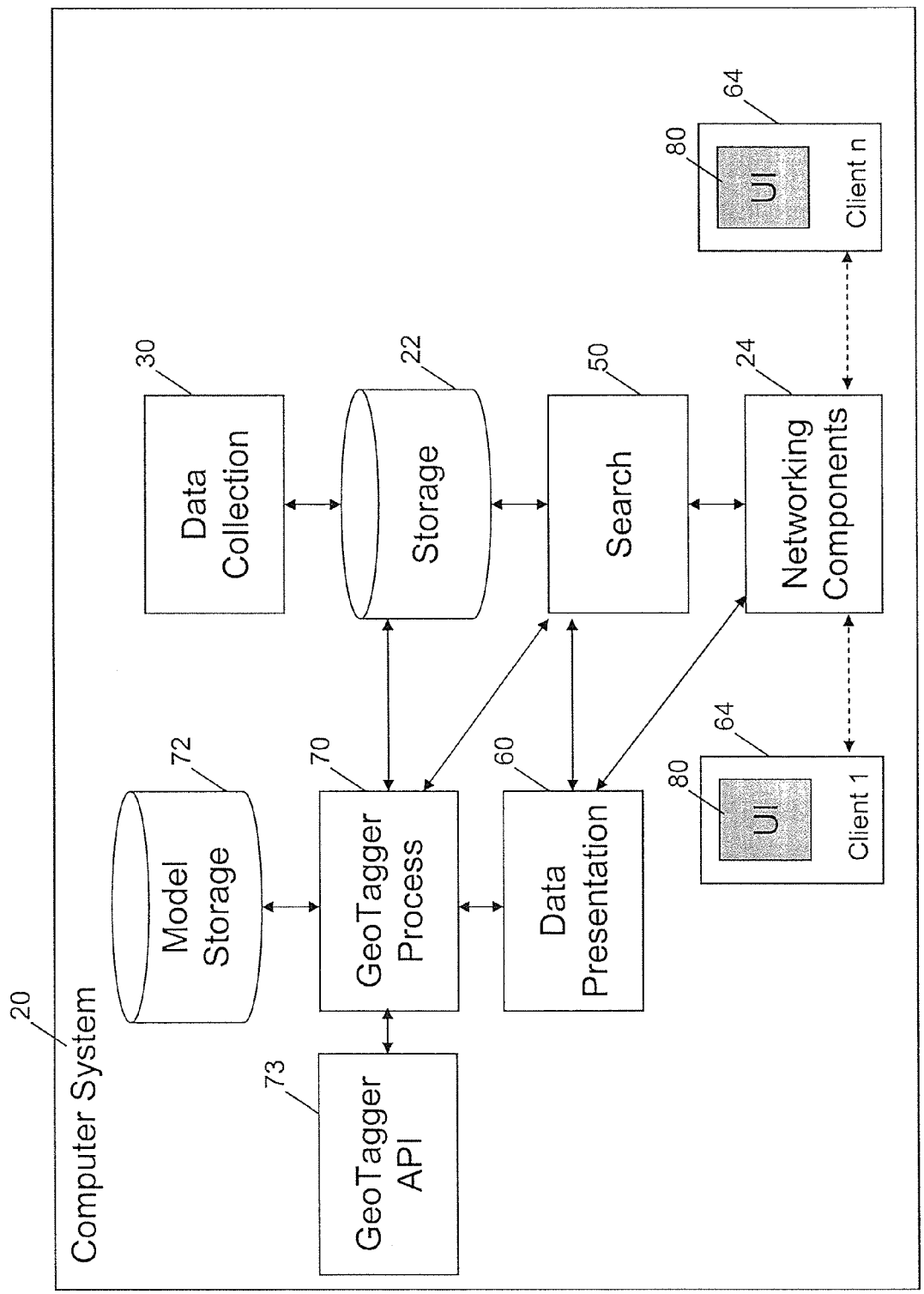
FIG. 4 is a block diagram showing the components of a computer system for implementing the described embodiment.

FIG. 4 is a more detailed rendition of the information in FIG. 3. The various natural language processing models are stored in model storage 72, and used by geotagger process 70. Geotagger process 70 offers API 73 to communicate with other processes, and also communicates with storage 22 and data presentation 60. The document collection represented by data collection 30 is stored in storage system 22 along with geotags created by geotagger process 70. Search module 50 indexes information from storage system 22, including meta-metadata that describes the locations associated with documents in data collection 30. Data presentation 60 and search module 50 both communicate with user interface UI 80 running in clients 64 via networking components 24. Data presentation module 60 allows UI 80 to display information about documents including map images and visual indicators of locations with various meta-metadata attributes. Search module 50 also powers functionality in UI 80 by providing search results in response to search criteria that may include filters based on meta-metadata.

Figure 5:
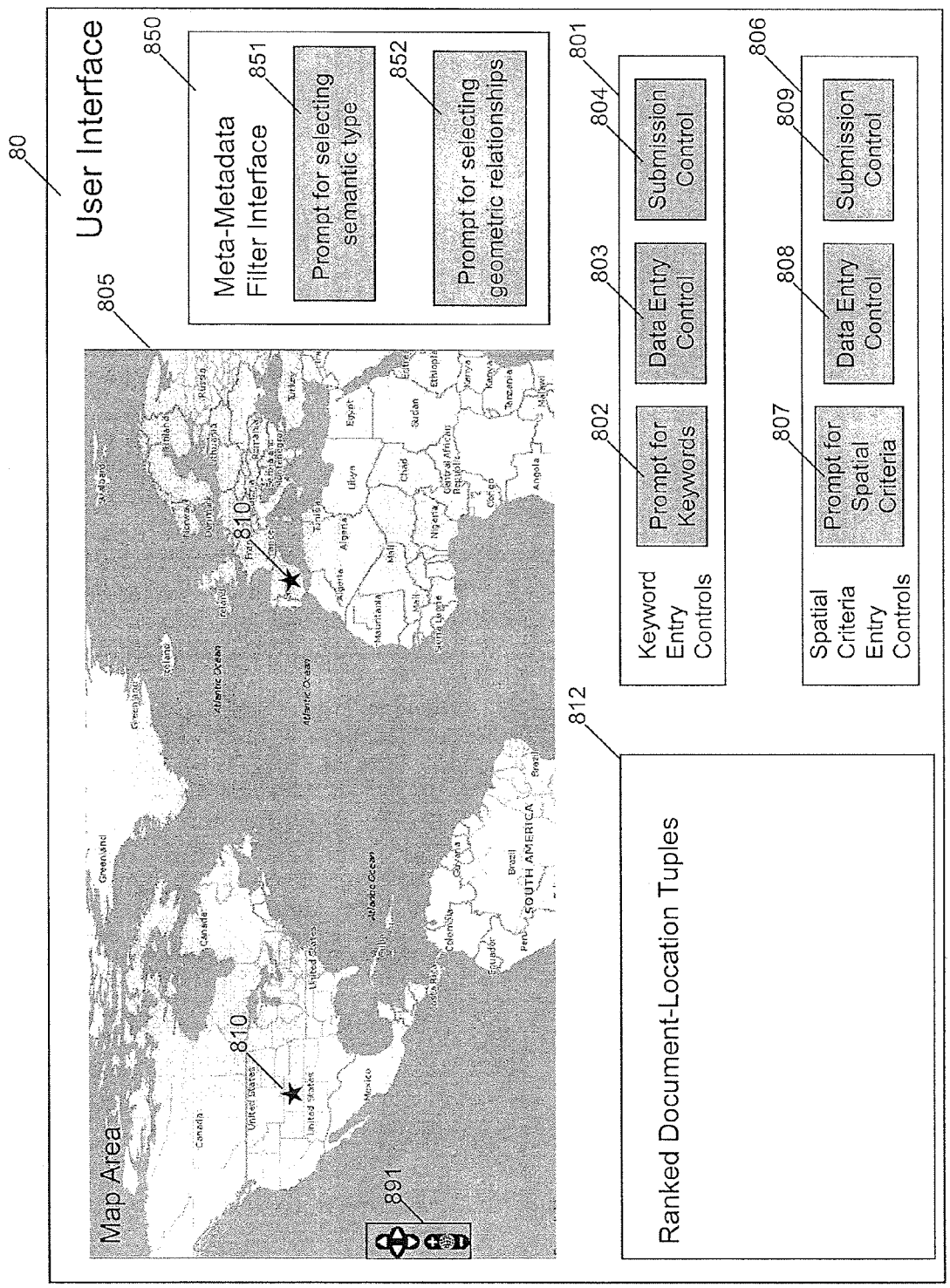
FIG. 5 is an illustration of a user interface for the presenting results of geographic searches, according to the described embodiment.

FIG. 5 illustrates user interface 80, which includes prompts or controls for allowing users to filter the search results using meta-metadata attributes (851, 852). These input mechanisms allow users to include or exclude documents or locations matching particular constraints based on meta-metadata attributes. For example, the prompt might be a checkbox that allows users to include or exclude document-location tuples where the location is referenced only in the byline of the document. The other controls in FIG. 5 are common in implementations of U.S. Pat. No. 7,117,199. Keyword entry controls 801 allow users to input a free-text query as part of their query. If the user does not submit a free-text query then any document that references a location within the domain identified by the domain identifier and that also matches any other query criteria is a candidate for inclusion in result list 812. Specific keyboard entry controls include keyword prompt 802, data entry control 803, and submission control 804. Spatial criteria entry controls (806) allow users to input a domain identifier as part of their query. These controls can affect map view 805. Specific spatial criteria entry controls include spatial criteria prompt 807, data entry control 808, and submission control 809. The bounding box of map view 805 can also be used as the domain identifier for the user's query. If the user does not specify a domain identifier, then the query may run using the entire world (or entire metric vector space) as the domain. The result list is a listing of visual representations of a set of documents that match the query constraints. These visual representations often include text excerpted from the documents and hyperlinks that allow users to load the documents into a viewer. Often, there is a visual association between items in the list and visual indicators in the map image, e.g. numbered icons displayed on the map and next to the result list items, or motion that highlights a visual indicator in the map when the user selects an item in the list or that highlights a listen item when the user indicates interest in a portion of the map or a visual indicator indicating a location in the map, such as, for example, star icons 810. The region displayed within map bounding box 805 can be controlled by the user by means of controls 891.

Semantic Type of Location References in a Document

Semantic typing is known in the art of natural language processing. Based on the semantic context of any phrase in natural language text, one can determine whether it is being used literally or metaphorically, and what relationships it might have to other concepts in the document.

Any context-dependent property of a location reference could be used as a semantic type. We specifically identify the context-dependent properties described below.

Place-of-author: when a news article or other document contains a so-called "byline" or author identification section it often includes a location name for the city where the author is writing. Often, this city is unrelated or only tangentially related to the subject of the article. A news article might begin with this text "By Andrew Taylor Associated Press Writer/Dec. 19, 2007 WASHINGTON—Congress approved . . . " In this text, the phrase "WASHINGTON" is an indication of the author's location. We refer to this as 'place-of-author.'

Place-of-subject: geographic references in the body of the text are qualitatively different from references in the byline location. Semantic geotyping distinguishes these two types of geographic references by introducing more information: the automatic geoparsing engine tags the byline location as having a semantic type 'literal-author-location' and tags the body location references as having other semantic types. When a document discusses a topic, we say that that topic is a "subject." A document might have many subjects. Some subjects may have one or more locations associated with them. We call these locations 'place-of-subject.' Often a reader is most interested in the locations that are places of a subject, rather than other locations like the author's location. Sometimes, the location of the author is the same as a location of a subject. In this case, such a location is both a place-of-subject and also a place-of-author.

For example, in the text mentioned above with a byline that includes "WASHINGTON," the subject matter involves the US Congress, which is an organization that holds meetings in Washington. The subject matter might not actually refer to the city of Washington; it might only refer to actions or decisions made by Congress. For example, it might state that "Congress approved a spending bill that will create new jobs in Detroit." In this case, Detroit is a place of a subject (creating new jobs) and it is also a "literal location."

For example, a georeference central to the subject of the article might be a 'literal-location' meaning that the string of characters refers to a specific place as the location of an event or action. Other semantic types that might occur in the substantive part of a document are 'place-for-people-government' or 'place-for-people-population', which are examples of metonymy. An example of place-for-people-population is "France feels heartbroken over its loss in the Euro Cup." The literal location known as France is not an entity capable of locations, however its people are. Thus, in this example, the word "France" is being used to refer to the population of that country. This is an example of place-for-people-population. Similarly, in the sentence "Italy moves to block treaty," the word "Italy" is being used to refer to the government of that country. This is an example of place-for-people-government.

As these examples illustrate, semantic typing involves judgment calls that even well-trained, reasonable people might debate. That is part of the nature of semantic typing. For our purposes, the utility of semantic typing is in the additional detail that a human user can gather by seeing highlighted semantic differences on a map.

The described attributes of location references in a document can be indicated in an output format, such as XML or JSON, generated by a geotagger API in response to a request from another system or human. For example, a geotag might be described by a set of XML elements that indicate coordinates for the location and a character range in the document that referred to the location. A text string naming the semantic type might be put into an XML attribute of the XML element describing the character range in the document.

To automatically determine the semantic type of any phrase in a natural language document, one typically builds a set of rules or a statistical model that identify which substring of a document is likely to be of a particular type. For example, to detect that a particular string is in the byline of a news article, a system might use the rule that it comes within the first 100 characters after the title text of a document. As another example, to detect that a string is being used to refer to a state actor instead of a literal location, a statistical model might take into account whether the word immediately following the string is a word that can be used as action verb.

As is standard in the art of statistical machine learning, one can create a statistical model for determining the probable semantic type or types that an author intended in using a particular phrase in a particular context. To create such a model, one creates a training set of example documents with markup metadata indicating which phrases in the example texts are being used to refer to places in different semantic types. That is, an example document might be the news article mentioned above. The manually approved metadata for this document would indicate that the reference to WASHINGTON is a byline and the later reference to Detroit is a 'literal-location' and a 'place-of-subject.' Such a model consists of a set of predicates, which are TRUE-FALSE tests, such as "is the phrase surrounded by punctuation that implies that it is at the beginning of a sentence." Each of these tests gives a true-false value for each character or each word token in the document.

Using a large number of such training documents, one can then "train" a model by simply counting how frequently each of the predicates gives an output of TRUE or gives an output of FALSE when operated on the substrings of the text that are identified as locations with a given semantic type. These frequencies of TRUE-FALSE detections around substrings that are known to be of a particular semantic type provide a mechanism for predicting when a string in a new document is of that same semantic type. Given a sufficiently diverse set of predicates and a sufficiently rich set of training data, a model can be trained to recognize location references with particular semantic types. The number of false positives and false negatives in the output of such a model can be improved by creating more predicates and training them on larger sets of training example texts.

The output of such a model is usually a set of predictions about which phrases in a text are of a particular type that the model has been trained to recognize. With each such prediction, the model can usually generate a probability that its prediction is correct. By choosing only those predictions with probabilities above a selected threshold, a downstream system can select for the amount of noise (false positives) or amount of misses (false negatives) that it receives.

Many of the automatic techniques for identifying the semantic type of a location cannot make a judgment with guaranteed certainty, so they produce probabilistic confidence scores as part of the output. These scores describe the likelihood that the system has identified the meaning intended by the author. For example, when generating a determination that a location reference is being used to refer to a state actor instead of a literal location, a system might also indicate that the probability that the author would agree is 0.678.

Geometric Relationships Between Locations Referenced in a Document

The second type of metadata that we add to the geotagger output are geometric relationships between geographic locations referenced in the same document. For example, if a document refers to both a country and also to several cities inside that country, the geometric relationship between these entities is "containment," i.e. the cities are contained inside the country. By containment we simply mean the standard notion of geometric containment, such as when a two-dimensional polygon fully encloses another two-dimensional polygon. In three-dimensions, a polyhedron can enclose another shape. Enclosure or containment means that the entire volume or area of the contained shape is a subset of the volume or area of the containing shape. While the concept of containment is well known in the art of geographic information systems, by providing containment and other geometric relationship information in the geotagger output, we allow downstream systems to make decisions using these relationships without needing to perform any analysis of the geometric objects themselves.

Other types of geometric relationships include: partial containment or "overlap" in which only a subset of a shape's area or volume is a subset of the other shape's area or volume; containment with shared boundary, which means that a shape is contained within another and part of the shared volume is on the boundary of both shapes; and proximity less than a number X, which means that the distance between a representative point in one shape and a representative point in another is less than the number X. This distance requires the use of a metric on the vector space in which the shapes are defined. In addition to geographic containment, bordering relationships are also useful, such as "adjacent to the west."

Detecting geometric containment or neighboring relationships between locations can be computationally expensive or even impossible if sufficient data is not available, so by including geometric relationships in the output of the geotagger system, we enable totally new applications, described below.

In analyzing a document to find location references, a geotagger system often encounters place names that are ambiguous, i.e., that might be used to refer to different places depending on the context. Often, a geotagger will distinguish between alternate location meanings by detecting a spatially related location that is co-referenced, such as a containing region. This helps to disambiguate the author's meaning. Instead of tagging such spatially related locations as just being other locations referenced in the text, the system identifies these locations as being "containers" or "disambiguators." A container is a region that geometrically contains other regions mentioned in the same document. A disambiguator is a container that is also useful for understanding the author's intended meaning, because it communicates some context about which part of the metric vector space the author is describing. For example, when the metric vector space is the planet Earth, an author might mention "Austria" and "Linz." Austria sets country-level context and Linz is a city in Austria. In this case, Austria is a disambiguator, because it helps communicate context.

An example of a document that has a container location as well as other non-container locations is this short document: "John Kerry traveled through Massachusetts yesterday making visits in Watertown, Needham, and Waltham. Next week, he will travel to Texas and Florida."

Figure 7:
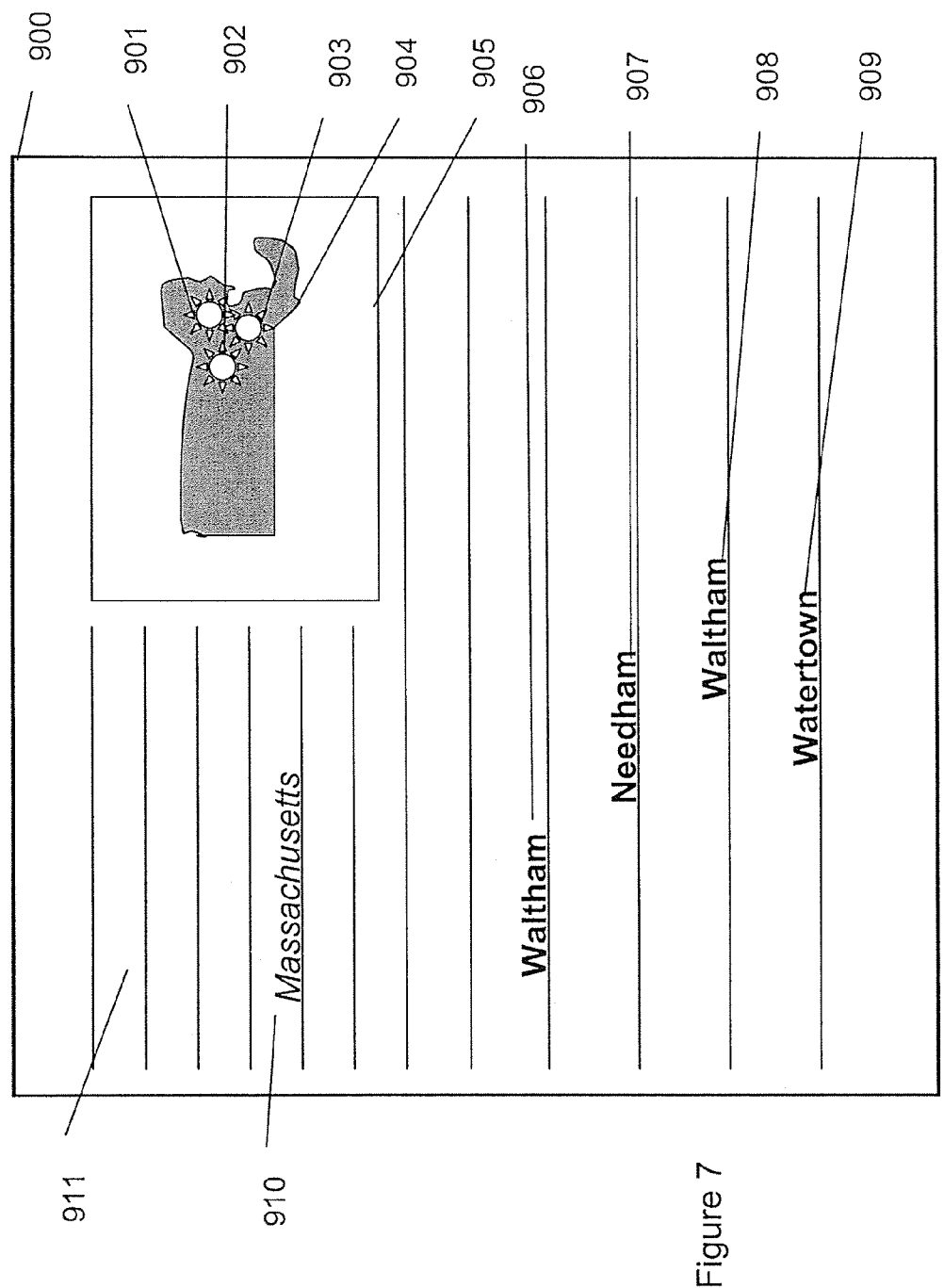
FIG. 7 is an illustration of a document having co-referenced location identifiers.

This is a one-sentence document. It refers to six locations, one of which is a container for three others. Massachusetts is a container location for Watertown, Needham, and Waltham. Texas and Florida are other locations that are not contained within Massachusetts. FIG. 7 illustrates how the system uses a geometric relationship between co-referenced locations to display content from document 911 on visual display 900. The system displays map image 905 featuring visual indicators indicating locations within a metric vector space. The locations are associated with the document. In this case, the association results from content in the document referring to the locations by name. The locations Waltham, Needham, and Watertown are represented by visual indicators in the map image (901, 902, 903) and referenced in the text (906, 907, 908, and 909). The document is also associated with the location Massachusetts because it refers to it in the text of the document (910). It is therefore also represented by a visual indicator in the map (904); however this visual indicator is different from the others (901, 902, 903) because Massachusetts is a containing location for other locations associated with the document.

An alternative version of the short document referred to above reads as follows:

"John Kerry traveled through Massachusetts yesterday making visits in Watertown, Needham, and Waltham. Next week, he will travel to Texas and Florida, which are other parts of the United States."

This version of the document refers to seven locations, one of which contains all of the other six. That is, the United States contains Texas, Florida, and Massachusetts, as well as the towns in Massachusetts. In this document, the location Massachusetts has the meta-metadata attributes "contained by other location referenced in document" and "contains other locations referenced in document." Several different queries might retrieve this document using geometric relationships as filters, as shown in Table 1.

TABLE 1

| | Query Criteria | Candidate Document-Location Tuples Include the Document and These Locations |
|---|---|---|
| Query 1 | All results must have a location that is not a container | Needham, Waltham, Watertown, Texas, Florida |
| Query 2 | All results must have a location that is not a container or is contained by a container that contains other locations that are not containers | Needham, Waltham, Watertown, Texas, Florida, Massachusetts |

In Table 1, Query 1 identifies five locations that do not contain any other locations. Query 2 adds Massachusetts to the list, because while Massachusetts is a container in this document, its parent container (the United States) contains to other co-referenced locations that are not containers (Florida and Texas). The meta-metadata constraints in the user interface allow these types of queries to be selected and adjusted by the user.

For a geotagger system to communicate information about geometric relationships, the system generates JSON or XML with attributes describing location references in the text.

The geotagger also indicates that a particular reference could be interpreted in multiple ways. Since these different meanings have different spatial relationships with each other, it is easiest to indicate spatial relationships by providing a so-called "path hierarchy" for each location that might be referenced by the document. For example, the path hierarchy for the City of Cambridge in Massachusettes is: "Earth, United States, Massachusetts, Cambridge." And the path hierarchy for the Town Hall of Cambridge is "Earth, United States, Massachusetts, Cambridge, Town Hall." The containment relationship is deterministically indicated by the overlap of parent nodes in the path hierarchy. If two locations have some parents in common, then they are at least contained within a common container, although they may not be adjacent.

The various path hierarchies in a document can be organized into a directed acyclic graph structure, as illustrated in the output in Appendix 1. This allows an application that receives the information from the API to traverse the location hierarchy and immediately know that any interior node of the graph is a containing region and any leaf node has no contained regions referenced in the text. This graph structure also allows applications to immediately find co-referenced regions that share a containing region: given any leaf node, simply traverse up to a parent node, and then consider that parent node's other children.

Visual Displays

One way of utilizing the meta-metadata provided by our geotagger API is in displaying more nuanced information to users viewing content from a document. We have described article mapper displays in previous filings, such as U.S. patent application Ser. No. 11/834,538, entitled "Geographical Text Search Enhancements," and in U.S. Patent Application No. 60/876,759, filed Dec. 21, 2006, entitled "Article Mapper with Geographic Search Enhancements." These displays augment the understanding of a human examining a document by visually highlighting location references in the displayed text and by depicting the referenced locations in a map image of the domain.

In some embodiments, the meta-metadata is used to visually differentiate between locations and location references. For example, locations that contain co-referenced locations might be highlighted in a less visually intense manner, because contained locations (i.e. those at the leaf nodes in the hierarchy) are often considered more interesting to the detailed meaning of a document. In anther example, the location of the author, which might have the meta-metadata "literal-author-location," is often considered less important than literal locations mentioned in the body of the article. Such locations might simply not be highlight in the visual display, or they may be given less prominent visual emphasis.

Figure 2B:
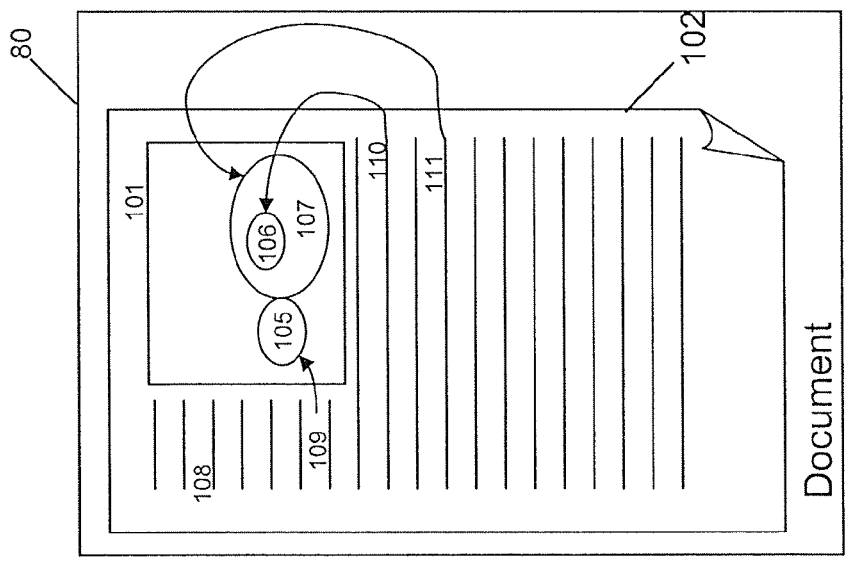
Figure 2A:
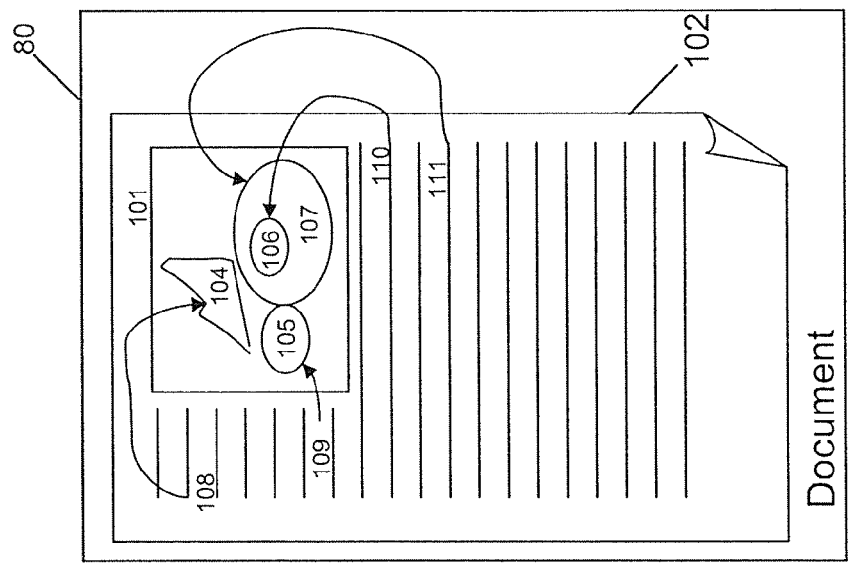

FIGS. 2A, 2B, and 2C illustrate the way that co-referenced location and semantic location metadata can be used to enhance the utility of a display. They show the information from FIG. 1 inside user interface 80. Map 101 is displayed within the visual display of document 102. In FIG. 2A, all the relationships between document 102 and map 101 are shown, including textual reference 108, which is a metonymic reference to a non-location entity. This corresponds to what most geotagging systems would do because such systems do not distinguish between literal locations and metonymic references since it is difficult to detect whether a location reference is metonymic. FIG. 2B illustrates using meta-metadata to suppress highlighting on map 101 locations that are only referenced in a non-literal fashion, such as location indicator 104. In FIG. 2C, the system uses the containment relationship between location indicators 106 and 107 to decide not to visually promote the importance of location indicator 107. Map 101 may still indicate the name of these various locations, but the highlighting of these non-literal, non leaf-node locations have been removed.

Search

Another way of utilizing the meta-metadata provided by our geotagger API is in searching for documents. Typically, geographic document searching, as described, for example, in U.S. Pat. No. 7,117,199, allows users to identify a domain of interest within a metric vector space. Documents that reference locations within the domain are candidates for inclusion in the result set.

We refine this approach to geographic document searching by allowing user interfaces that utilize our search engine to also specify query criteria based on meta-metadata that may exist for some of the documents indexed in the search engine. For example, a new type of query criterion can be "only include documents that reference locations within this domain if the reference does not contain any other co-referenced locations." This reduces clutter in the map display and allows the user to see smaller locations, which are often more interesting.

Another example is "only include documents that reference locations within this domain if the reference is a literal-location reference." This allows the user to focus on those search results (document-location pairs) that refer to locations intended to be locations and not locations intended to be state actors. For example, a document might contain the sentence "France is debating whether to maintain its embassy in Port Harcourt." Even if the domain identifier submitted in the query covered both the country of France and the city of Port Harcourt in Nigeria, if the query also included a constraint to only use literal-locations, then the location reference to France would not be included in the search results, because it is being used as a metonymic reference to a state actor.

A query answered by a geographic search engine might include only a single criterion involving only geometric constraints or only semantic category constraints. For example, a query might say, "return only document-location tuples in which the location is not a container location, i.e., does not contain any other locations referenced in the document." Such a query might not have any other constraints, i.e., no spatial identifier and no free-text query and no other filters.

A query answered by a geographic search engine might include a geometric constraint or a semantic category constraint along with a free-text query constraint. For example, a query might say, "return only document-location tuples in which the location is not a container location and the document is responsive to the keyword 'sailing.'" Such a query might get a response containing documents that refer to "sailing" or "sail boats" and also refer to location without mention locations within them.

Another type of geometric constraint that might be used in a query or in displaying information about a document is "this location contains locations that are themselves containers of locations that are not containers." This is equivalent to saying that the locations are at a particular level above the leaf-node level in the hierarchy of locations.

A query might combine semantic typing and geometric constraints by saying "return only document-location tuples in which the location is referenced by the document and is not a container and is not a byline." For another example of combining the constraints, a query might say "return only document-location tuples in which the location is referenced by the document and is not a container and is a literal location and is a place-of-subject with a place-of-subject-confidence over 0.45." The last clause regarding the place-of-subject-confidence means that the results are restricted to only include those document-location tuples in which the location is believed to be a place-of-subject with a probability of correctness of more than 45%.

To make these queries possible, the search engine must have additional fields of information indexed with each document. For example, the index of document-location tuples must allow a query to quickly select out only those locations that have a particular semantic type or that contain or do not contain co-referenced locations. A document-location tuple is a conceptual pairing of a document and a location associated with the document. Often, the particular implementation of a document-location tuple in a particular system will be a document identifier and a location identifier. For example, a document identifier might be a URL or an ID number, and a location identifier might be a list of containing regions or a set of latitude-longitude coordinates. By listing two such identifiers together, one has a document location tuple. Geographic search results typically consist of a set of document-location tuples visually represented to a user as a listing of clickable hyperlinks and locations named in text and/or indicated on a map image.

One way of accessing this new information in the index is to pass a set of query constraints along with a query string. For example, if the programmatic API to the search engine is an HTTP request, then the query string might be passed as the value to a CGI field named "q" and a constraint indicating that only locations of a particular semantic type might be passed by setting the value of a CGI field named 'semantic_type' to the desired value, e.g., 'literal-location.'

Another way of allowing search requesters to utilize the containment information and other meta-metadata is to extend the query string language. That is, to add new operators to the list of special strings that may be included in the query string. Common query string operators include "site:" and "inurl:", which restrict the results to only containing documents hosted by a particular site or that have a particular string in their URL. Typically, operators have a colon symbol following a special string, like "site" or "inurl" and the characters entered after the colon are used as the input to the operator. For example, "site:cars.com" will limit results to only include documents served from the servers in the cars.com Internet domain name. To include white space in the string following the operator's colon, one must enclose the string in quotation marks.

Our search engine allows users or applications that send queries to the search engine to include special operators in the query string specifying constraints on the meta-metadata. These query operators are part of the query language for the search engine. For example, the operator "semantic_type:" allows the user to specify that only locations with a particular semantic_type should be included in the list of document-location tuples returned in response to the query. For example, including the string "semantic_type:literal-location" in the query string will limit results to only those location references that are considered literal-locations and not place-for-government or other semantic types.

Figure 6:
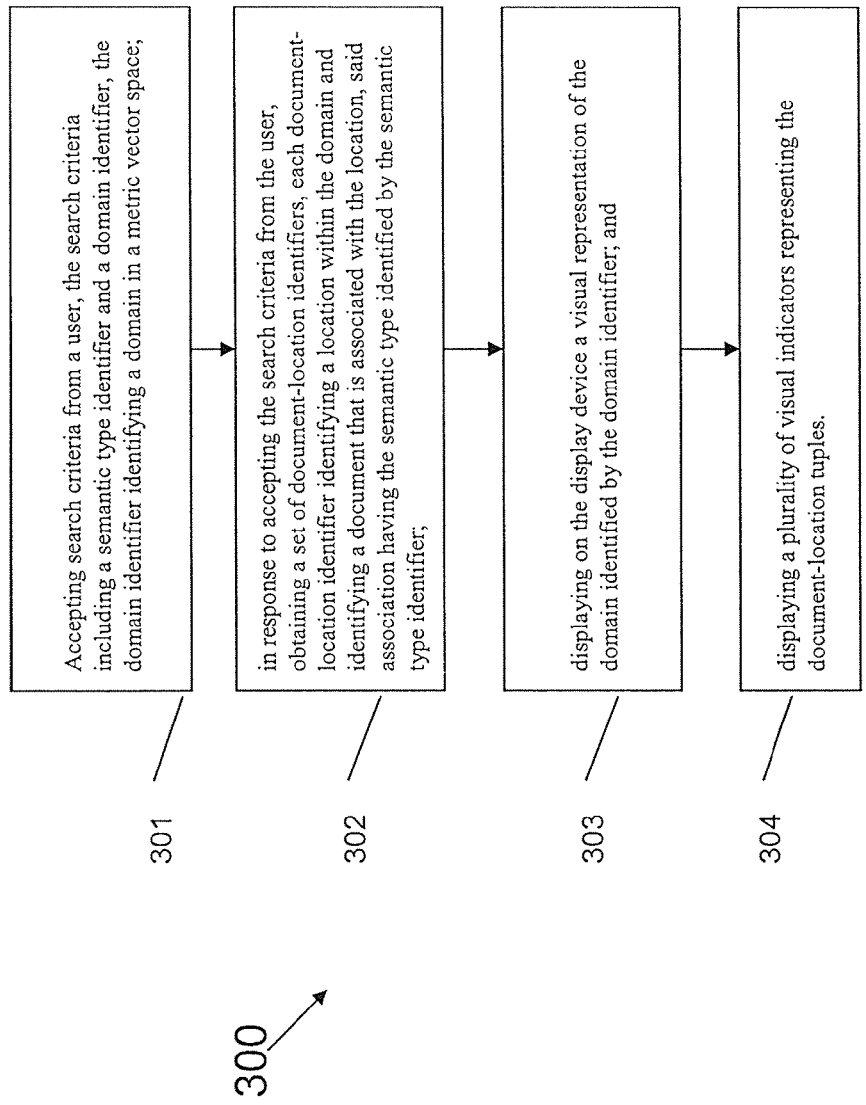
FIG. 6 is a flow diagram showing steps involved in performing a text search and displaying the result, according to the described embodiment.

FIG. 6 illustrates the process of performing a search that involves the semantic type of a location reference. The process starts with accepting search criteria from a user, the search criteria including a semantic type identifier and a spatial identifier that identifies a location in a metric vector space (301). In response to accepting the search criteria from the user, the system obtains a set of document-location identifiers, each document-location identifier identifying a location within the domain and identifying a document that is associated with the location, said association having the semantic type identified by the semantic type identifier (302); displaying on the display device a visual representation of the domain identified by the domain identifier (303); and displaying a plurality of visual indicators representing the document-location tuples (304).

A number of embodiments of the invention have been described. Nevertheless, it will be understood that various modifications may be made without departing from the spirit and scope of the invention. Accordingly, other embodiments are within the scope of the following claims.

The invention claimed is:

1. A computer-implemented method of displaying information about a document that includes a plurality of spatial identifiers each of which identifies a corresponding location within a metric space and at least two of the locations of the spatial identifiers have a geometric relationship to each other, said method comprising:
    displaying at least a portion of content from the document, wherein the at least one portion of content is a natural language;
    displaying a map image of a portion of the metric space;
    displaying a visual indicator at a position on the map image representing the location that corresponds to one of said plurality of spatial identifiers;
    visually indicating that the location corresponding to the visual indicator has associated data that characterizes the geometric relationship between that location and the location of another spatial identifier in the document, wherein the geometric relationship is determined by a path hierarchy for each location; and
    visually differentiating, by visually promoting and highlighting differently, the at least two corresponding locations based on attributes that are defined with reference to the document, wherein the locations that are metonymic are given less prominent visual emphasis than other locations.

2. The computer-implemented method of claim 1, wherein the geometric relationship is one of being a container of another location.

3. The computer-implemented method of claim 1, wherein the geometric relationship is one of being contained in another location.

4. The computer-implemented method of claim 1, wherein the geometric relationship is one of being overlapping with another location.

5. The computer-implemented method of claim 1, wherein the geometric relationship is one of being a neighbor of another location.

6. The computer-implemented method of claim 1, wherein the path hierarchy is organized into a directed acyclic graph structure.

7. A computer-implemented method of displaying information about a document that includes a spatial identifier that identifies a corresponding location within a metric space and wherein that spatial identifier is characterized by a semantic type that is determined by the use of the spatial identifier within the document, said method comprising:
    displaying at least a portion of content from the document, wherein the at least one portion of content is a natural language;
    visually identifying the spatial identifier within a displayed visual representation of the content from the document;
    visually indicating the semantic type of the spatial identifier wherein the semantic type is determined by a path hierarchy for each location; and
    visually differentiating, by visually promoting and highlighting differently, two or more corresponding locations based on attributes that are defined with reference to the document, wherein the locations that are metonymic are given less prominent visual emphasis than other locations.

8. The computer-implemented method of claim 7, further comprising:
    along with the displayed visual representation of content, also displaying a map image of a portion of the metric space; and displaying a visual indicator at a position on the map image representing the location that corresponds to the spatial identifier.

9. The computer-implemented method of claim 7, wherein the semantic type is a context-dependent property of the spatial indicator.

10. The computer-implemented method of claim 7, wherein the semantic type is place-of-author.

11. The computer-implemented method of claim 7, wherein the semantic type is place-of-subject.

12. The computer-implemented method of claim 7, wherein the semantic type is literal location.

13. A computer-implemented method of displaying information about a document that includes a spatial identifier that identifies a corresponding location within a metric space and wherein that spatial identifier is a semantic type, said method comprising:
- displaying at least a portion of content from the document, wherein the at least one portion of content is a natural language;
- displaying a map image of a portion of the metric space;
- displaying a visual indicator at a position on the map image representing the location that corresponds to the spatial identifier;
- visually indicating the semantic type of the spatial identifier wherein the semantic type is determined by a path hierarchy for each location, and
- visually differentiating, by visually promoting and highlighting differently, two or more corresponding locations based on attributes that are defined with reference to the document, wherein the locations that are metonymic are given less prominent visual emphasis than other locations.

14. A non-transitory computer readable medium storing code for use with a document that includes a plurality of spatial identifiers each of which identifies a corresponding location within a metric space and at least two of the locations of the spatial identifiers have a geometric relationship to each other, wherein said code when executed on a computer system causes the computer system to:
- display at least a portion of content from the document, wherein the at least one portion of content is a natural language;
- display a map image of a portion of the metric space;
- display a visual indicator at a position on the map image representing the location that corresponds to one of said plurality of spatial identifiers;
- visually indicate that the location corresponding to the visual indicator has associated data that characterizes the geometric relationship between that location and the location of another spatial identifier in the document wherein the geometric relationship is determined by a path hierarchy for each location; and
- visually differentiate, by visually promoting and highlighting differently, the at least two corresponding locations based on attributes that are defined with reference to the document, wherein the locations that are metonymic are given less prominent visual emphasis than other locations.

15. A non-transitory computer readable medium storing code for use with a document that includes a spatial identifier that identifies a corresponding location within a metric space and wherein that spatial identifier is characterized by a semantic type that is determined by use of the spatial identifier within the document, wherein said code when executed on a computer system causes the computer system to:
- display at least a portion of content from the document, wherein the at least one portion of content is a natural language;
- visually identify the spatial identifier within a displayed visual representation of the content from the document;
- visually indicate the semantic type of the spatial identifier wherein the semantic type is determined by a path hierarchy for each location; and
- visually differentiate, by visually promoting and highlighting differently, two or more corresponding locations based on attributes that are defined with reference to the document, wherein the locations that are metonymic are given less prominent visual emphasis than other locations.

16. A method of displaying information contained within a document, the method comprising:
- displaying at least a portion of content from the document, wherein the at least one portion of content is a natural language;
- receiving information that identifies a first portion of the document containing a first identifier that references a first location in a metric vector space;
- receiving information that identifies a second portion of the document containing a second identifier that references a second location in the metric vector space;
- receiving information describing a geometric relationship between the first location and the second location;
- displaying a map of a portion of the metric vector space, a domain encompassing at least a part of one of the first and second locations;
- displaying at least one of the first location and the second location on the map, wherein a mode of displaying the at least one of the first location and the second location is determined by the geometric relationship between the first and second locations wherein the geometric relationship is determined by a path hierarchy for each location; and
- differentiating visually, by visually promoting and highlighting differently, the first and second locations based on attributes that are defined with reference to the document wherein the locations that are metonymic are given less prominent visual emphasis than other locations.

17. A method of displaying information contained within a document, the method comprising:
- identifying a portion of the document that contains an identifier that references a location in a metric vector space;
- analyzing the portion of the document to obtain a semantic category of the identifier, the semantic category identifying a sense in which an author of the document intended to use the identifier in the portion of the document;
- displaying at least a portion of content from the document, wherein the at least one portion of content is a natural language;
- displaying a map of the domain of the metric vector space, the domain encompassing at least a part of the location referenced by the identifier;
- displaying on the map of the domain the location referenced by the identifier, wherein a mode of displaying the location referenced by the identifier is determined by the semantic category of the identifier wherein the semantic category is determined by a path hierarchy for each location; and
- differentiating visually, by visually promoting and highlighting differently, at least two locations based on attributes that are defined with reference to the document, wherein the locations that are metonymic are given less prominent visual emphasis than other locations.

* * * * *